US012533794B2

United States Patent
Iwasaki et al.

(10) Patent No.: US 12,533,794 B2
(45) Date of Patent: Jan. 27, 2026

(54) ROBOT WITH TWO-AXIS HAND MOTOR

(71) Applicant: KABUSHIKI KAISHA YASKAWA DENKI, Kitakyushu (JP)

(72) Inventors: Norihisa Iwasaki, Fukuoka (JP); Go Yamaguchi, Fukuoka (JP); Kazunori Hino, Fukuoka (JP); Yuta Tanda, Fukuoka (JP)

(*) Notice: Subject to any disclaimer, the term of this patent is extended or adjusted under 35 U.S.C. 154(b) by 0 days.

(21) Appl. No.: 18/762,670

(22) Filed: Jul. 3, 2024

(65) Prior Publication Data

US 2025/0010465 A1    Jan. 9, 2025

(30) Foreign Application Priority Data

Jul. 6, 2023   (JP) .................. 2023-111679

(51) Int. Cl.
*B25J 9/04*    (2006.01)
*B25J 9/10*    (2006.01)
*B25J 9/12*    (2006.01)
*B25J 15/00*   (2006.01)
*B25J 19/00*   (2006.01)

(52) U.S. Cl.
CPC ............. *B25J 9/043* (2013.01); *B25J 9/126* (2013.01); *B25J 15/0028* (2013.01); *B25J 9/108* (2013.01); *B25J 19/0025* (2013.01)

(58) Field of Classification Search
CPC ........ B25J 9/043; B25J 9/126; B25J 15/0028; B25J 9/108; B25J 19/0025; H01L 21/67742
See application file for complete search history.

(56) References Cited

U.S. PATENT DOCUMENTS 6,190,104 B1    2/2001   Ikeda et al.
6,363,808 B1    4/2002   Wakabayashi et al.
(Continued)

FOREIGN PATENT DOCUMENTS

JP    S63-191588    8/1988
JP    H11-033947    2/1999
(Continued)

OTHER PUBLICATIONS

Soei Patent and Law Firm, Statement of Related Matters, dated Sep. 18, 2024.
(Continued)

*Primary Examiner* — Minnah L Seoh
*Assistant Examiner* — Gregory T Prather
(74) *Attorney, Agent, or Firm* — SHIPWAY IP

(57) ABSTRACT

A robot includes a hand motor configured to independently rotate a first hand and a second hand around a hand axis along a vertical orientation. The hand motor includes: a first output shaft fixed to the first hand; a first stator configured to apply a rotating magnetic field on the first output shaft in the arm link; a second output shaft extending through the first output shaft and fixed to the second hand; a second stator configured to apply a rotating magnetic field on the second output shaft in the arm link; a first bearing held by the arm link and holding the first output shaft or the second output shaft; and a second bearing held by the second output shaft between an outer periphery of the second output shaft and an inner periphery of the first output shaft.

20 Claims, 13 Drawing Sheets

(56) References Cited

U.S. PATENT DOCUMENTS

| | | | |
|---|---|---|---|
| 6,382,902 B1 * | 5/2002 | Sugimura | H01L 21/68707 414/217 |
| 10,391,640 B1 | 8/2019 | Yoshida et al. | |
| 2005/0011294 A1 | 1/2005 | Hashimoto et al. | |
| 2013/0071218 A1 * | 3/2013 | Hosek | B25J 19/0054 414/744.5 |
| 2013/0195600 A1 * | 8/2013 | Furuichi | B25J 9/043 414/744.5 |
| 2020/0016755 A1 | 1/2020 | Harada et al. | |
| 2020/0122316 A1 * | 4/2020 | Tsang | B65G 47/907 |
| 2020/0365438 A1 | 11/2020 | Sato | |
| 2021/0111051 A1 | 4/2021 | Senoue | |
| 2021/0257241 A1 * | 8/2021 | Bussiere | B65G 47/90 |
| 2022/0410944 A1 | 12/2022 | Lee et al. | |
| 2023/0381948 A1 | 11/2023 | Sanemasa et al. | |

FOREIGN PATENT DOCUMENTS

| | | |
|---|---|---|
| JP | 2000-068219 | 3/2000 |
| JP | 2000-167792 | 6/2000 |
| JP | 2005-039047 | 2/2005 |
| JP | 2012-007734 | 1/2012 |
| JP | 2012-152898 | 8/2012 |
| JP | 2015-123551 | 7/2015 |
| JP | 6449762 | 1/2019 |
| JP | 2020-074440 | 5/2020 |
| JP | 2020-188218 | 11/2020 |
| JP | 7050170 | 4/2022 |
| JP | 7078479 | 5/2022 |
| JP | 2023-004870 | 1/2023 |
| JP | 2023-174279 | 12/2023 |
| WO | 2011/161888 | 12/2011 |
| WO | 2019/189883 | 10/2019 |
| WO | 2020/054385 | 3/2020 |
| WO | 2022/010964 | 1/2022 |

OTHER PUBLICATIONS

Office Action issued in Japanese Patent Application No. P2023-111679, dated Jun. 3, 2025 (with English partial translation).

Office Action issued in Korean Patent Application No. 10-2024-0088486, dated Nov. 17, 2025 (with English partial translation).

* cited by examiner

ROBOT WITH TWO-AXIS HAND MOTOR

CROSS-REFERENCE TO RELATED APPLICATIONS

This application is based upon and claims the benefit of priority from Japanese Patent Application No. 2023-111679, filed on Jul. 6, 2023, the entire contents of which are incorporated herein by reference.

BACKGROUND

Field

The present disclosure relates to a robot.

Description of the Related Art

PCT International Publication No. 2020/054385 discloses a robot including a robot arm, a plurality of stages of hands including a first hand and a second hand provided at a tip of the robot arm, a first direct drive motor having a rotation axis defined at the tip of the robot arm and rotatably coupling the first hand to the tip of the robot arm around the rotation axis, and a second direct drive motor rotatably coupling the second hand to the first hand around the rotation axis.

SUMMARY

Disclosed herein is a robot for handling an electronic substrate. The robot may include: an articulated arm including a plurality of links connected by a plurality of joints, wherein the plurality of links include: a first hand and a second hand each of which is configured to support the electronic substrate; a base; and one or more arm links connecting the first hand and the second hand to the base; and a plurality of motors configured to drive the plurality of joints respectively to change a position and a posture of the first hand and the second hand, wherein the plurality of joints include a hand joint connecting the first hand and the second hand to an arm link of the one or more arm links, wherein the plurality of motors include a hand motor configured to independently rotate the first hand and the second hand around a hand axis along a vertical orientation perpendicular to the electronic substrate supported by the first hand or the second hand, and wherein the hand motor includes: a first output shaft fixed to the first hand; a first stator configured to apply a rotating magnetic field around the hand axis on the first output shaft in the arm link; a second output shaft extending through the first output shaft and fixed to the second hand; a second stator configured to apply a rotating magnetic field around the hand axis on the second output shaft in the arm link; a first bearing held by the arm link and holding the first output shaft or the second output shaft to rotate around the hand axis; and a second bearing held by the second output shaft between an outer periphery of the second output shaft and an inner periphery of the first output shaft, to hold the first output shaft to rotate around the hand axis.

Additionally, a robot is disclosed herein. The robot may includes: an articulated arm including a plurality of links connected by a plurality of joints, wherein the plurality of links comprise: a first hand and a second hand; a base; and one or more arm links connecting the first hand and the second hand to the base; and a plurality of motors configured to drive the plurality of joints respectively to change a position and a posture of the first hand and the second hand, wherein the plurality of joints include a hand joint connecting the first hand and the second hand to an arm link of the one or more arm links, wherein the plurality of motors include a hand motor configured to independently rotate the first hand and the second hand around a hand axis, and wherein the hand motor comprises: a first output shaft fixed to the first hand; a first stator configured to apply a rotating magnetic field around the hand axis on the first output shaft in the arm link; a second output shaft extending through the first output shaft and fixed to the second hand; a second stator configured to apply a rotating magnetic field around the hand axis on the second output shaft in the arm link; a first bearing held by the arm link and holding the first output shaft or the second output shaft to rotate around the hand axis; and a second bearing held by the second output shaft between an outer periphery of the second output shaft and an inner periphery of the first output shaft, to hold the first output shaft to rotate around the hand axis.

DETAILED DESCRIPTION

In the following description, with reference to the drawings, the same reference numbers are assigned to the same components or to similar components having the same function, and overlapping description is omitted.

Electronic Substrate Transfer Device

Figure 1:
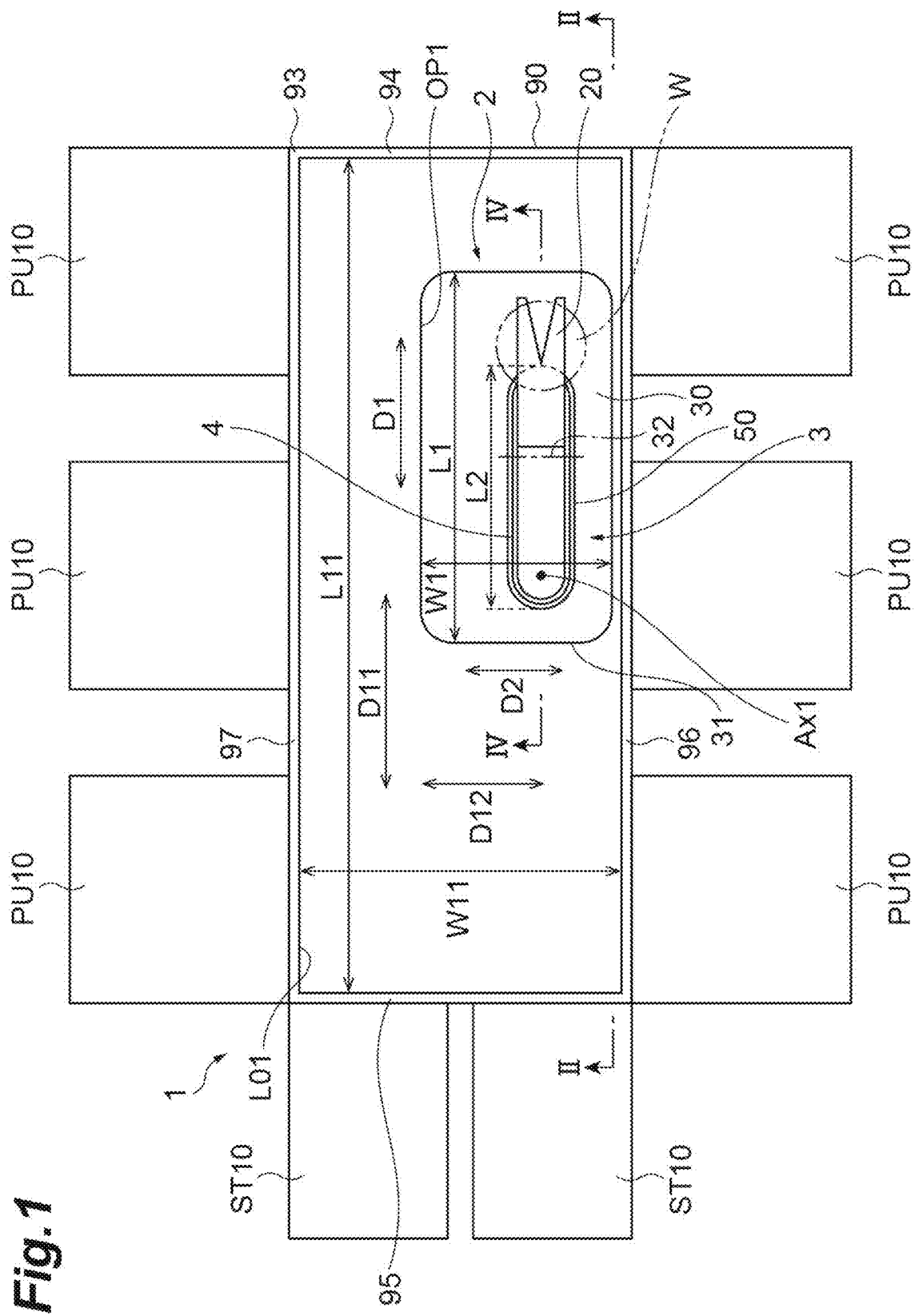
FIG. 1 is a plan view illustrating the inside of an example electronic substrate transfer device.
Figure 2:
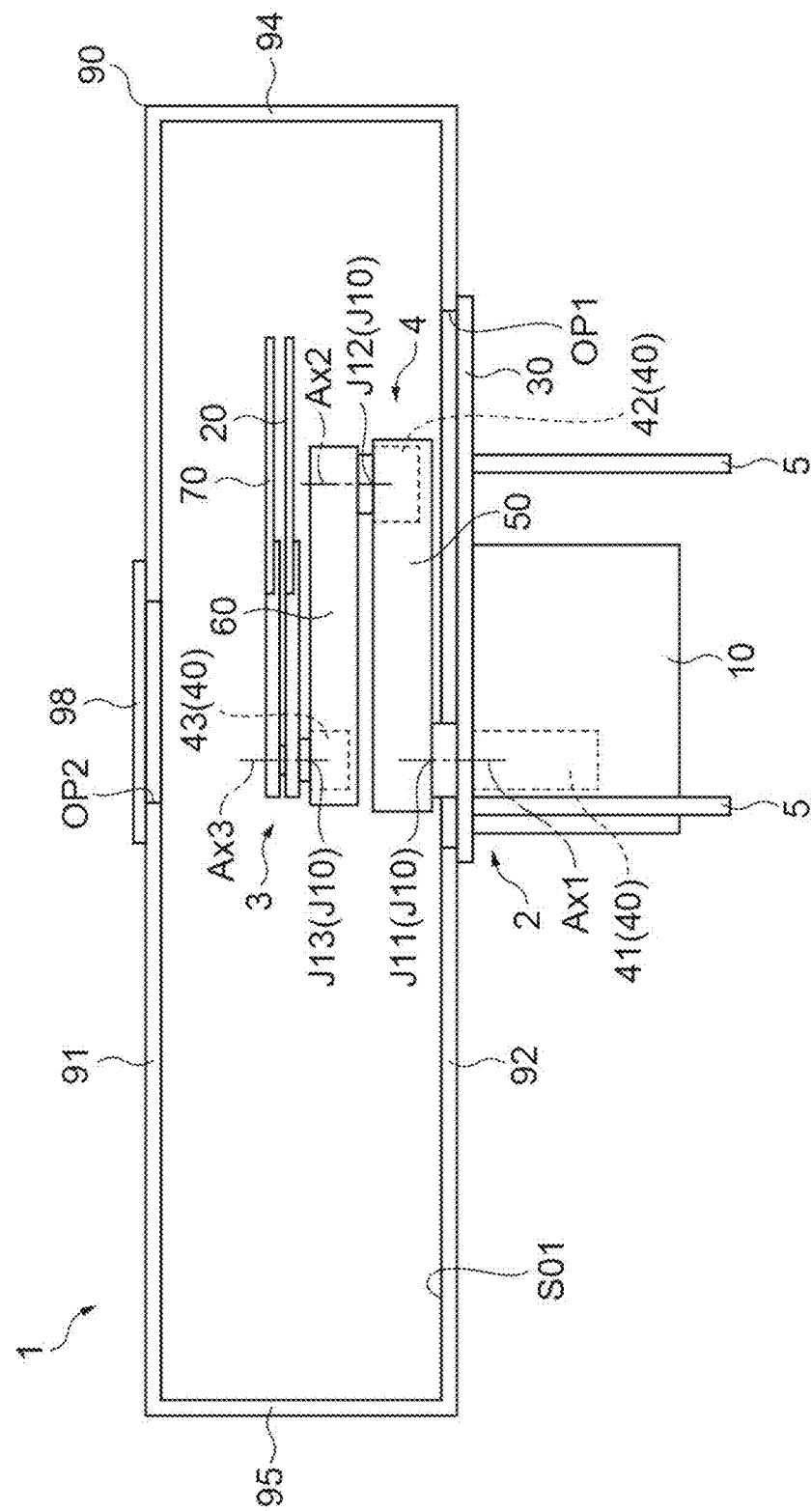
FIG. 2 is a cross-sectional view taken along line II-II in FIG. 1.

An electronic substrate transfer device 1 illustrated in FIGS. 1 and 2 is an apparatus for transporting an electronic substrate W between one or more stations ST10 in which the electronic substrate W is stored and a plurality of processing modules PU10. Examples of the electronic substrate W include a semiconductor substrate, a glass substrate, a mask substrate, and an FPD (Flat Panel Display) substrate. The electronic substrate transfer device 1 includes a chamber 90 and a robot 2. The chamber 90 has a longitudinal orientation D11 and a short orientation D12 perpendicular to the longitudinal orientation D11. The longitudinal orientation D11 and the short orientation D12 are arranged along a horizontal plane.

The chamber 90 includes a top plate 91 and a bottom plate 92 that are vertically aligned with each other and further includes a peripheral wall 93 surrounding a space between the top plate 91 and the bottom plate 92. Hereinafter, the space surrounded by the peripheral wall 93 is referred to as a conveyance space S01.

The peripheral wall 93 has end walls 94, 95 facing each other in the longitudinal orientation D11, each along the short orientation D12, and side walls 96, 97 facing each other in the short orientation D12, each along the longitudinal orientation D11. A distance L11 of the end wall 94 and the end wall 95 is the length of the chamber 90 in the longitudinal orientation D11, and a distance W11 of the side wall 96 and the side wall 97 is the width of the chamber 90 in the short orientation D12. The distance L11 is larger than the distance W11.

The one or more stations ST10 and the plurality of processing modules PU10 described above are disposed around the chamber 90. In the illustrated example, two stations ST10 are disposed along the end wall 95, three processing modules PU10 are disposed along the side wall 96, and three processing modules PU10 are arranged along the side wall 97, but the number and arrangement of the stations ST10 and the number and arrangement of the processing modules PU10 are not limited thereto.

The robot 2 transfers the electronic substrate W between the one or more stations ST10 and the plurality of processing modules PU10 in the conveyance space S01. For example, the robot 2 unloads the electronic substrate W from any of the one or more stations ST10 and loads the electronic substrate W into any of the plurality of processing modules PU10. Further, the robot 2 unloads the electronic substrate W from any of the plurality of processing modules PU10 and loads the electronic substrate W into any of the one or more stations ST10.

As illustrated in FIG. 2, the robot 2 includes an articulated arm 3 and a plurality of actuators 40. The articulated arm 3 includes a plurality of links connected by a plurality of joints J10. The plurality of links may include the hand 20, the base 10, and one or more arm links 50, 60 connecting the hand 20 to the base 10. For example, the articulated arm 3 includes a hand 20, a base 10, an arm 4, and a plurality of joints J10. The base 10 is secured to the environment in which the articulated arm 3 is placed. The hand 20 supports the electronic substrate W horizontally. The arm 4 connects the base 10 to the hand 20. The plurality of joints J10 are arranged along the arm 4, and each moves around a vertical axis to change the position and posture of the hand 20 relative to the base 10. The plurality of actuators 40 drive the plurality of joints J10, respectively. For example, the plurality of actuators 40 is configured to drive the plurality of joints J10 respectively around rotational axes each of which is along a vertical orientation perpendicular to the electronic substrate W supported by the hand 20, to change a position and a posture of the hand 20 relative to the base while the hand 20 supporting the electronic substrate W.

For example, the arm 4 includes a first link 50 and a second link 60. The plurality of joints J10 include a first joint J11, a second joint J12, and a third joint J13. The first joint J11 connects the first link 50 to the base 10 so as to rotate around a first axis Ax1 that is vertical. The first axis Ax1 is one of the one or more axes. The second joint J12 connects the second link 60 to the end of the first link 50 so as to rotate around a second axis Ax2 that is vertical. The first axis Ax2 is one of the one or more axes. The third joint J13 connects the hand 20 to the end of the second link 60 so as to rotate around a third axis Ax3 that is vertical. The first axis Ax3 is one of the one or more axes. The base 10, the first link 50, the second link 60, and the hand 20 connected by the joints J11, J12, J13 are all "links of the articulated arm 3".

The actuator 40 includes arm actuators 41, 42 and a hand actuator 43. The arm actuator 41 (base actuator) drives the first joint J11 so as to rotate the first link 50 around the first axis Ax1 relative to the base 10. The arm actuator 42 drives the second joint J12 so as to rotate the second link 60 around the second axis Ax2 relative to the first link 50 independently of the rotation of the first link 50 by the arm actuator 41. The hand actuator 43 drives the third joint J13 so as to rotate the hand 20 around the third axis Ax3 relative to the second link 60 independently of the rotation of the first link 50 by the arm actuator 41 and the rotation of the second link 60 by the arm actuator 42.

Along the arm 4, the arm actuator 41 is proximate to (for example, most proximal from) the base 10, the arm actuator 42 is second most proximal from the base 10, and the hand actuator 43 is most distal from the base 10. The hand actuator 43 is proximate to (for example, most proximal from) the hand 20. Being most proximal from the base 10 includes being in the base 10.

At least a part of the articulated arm 3 is disposed within the conveyance space S01 so as to convey the electronic substrate W. For example, at least a part of the articulated arm 3 is placed in the conveyance space S01 via an opening OP1 provided in the bottom plate 92. Entry of dust into the chamber can be prevented as compared with a case where the top plate 91 is provided with the opening OP1 for carrying the articulated arm 3 into the conveyance space S01. The robot 2 may further include a flange 30. The flange 30 holds the base 10 and covers the opening OP1.

In a state where the flange 30 covers the opening OP1, At least the arm 4 and the hand 20 are placed in the conveyance space S01. The base 10 may be placed within the conveyance space S01 or may be placed outside the conveyance space S01. For example, the base 10 is placed outside the conveyance space S01. By placing the base 10 outside the conveyance space S01, the size of the conveyance space S01 can be reduced and energy for evacuating the inside of the conveyance space S01 can be reduced.

The flange 30 spreads to partition between the base 10 and the arm 4 and the hand 20 to cover the opening OP1. The flange 30 has a longitudinal orientation D1. For example, the flange 30 extends along a plane that includes the longitudinal orientation D1 and a short orientation D2 perpendicular to the longitudinal orientation D1, and a length L1 of the flange 30 in the longitudinal orientation D1 is greater than a width W1 of the flange 30 in the short orientation D2.

The first axis Ax1 of the first joint J11, which is the most proximal joint from the base 10 among the plurality of joints J10, is located closer to one end 31 between the one end 31 of the flange 30 and a center 32 of the flange 30 in the longitudinal orientation D1 of the flange 30. For example, the first axis Ax1 is located between the one end 31 and the center 32 of the flange 30, and the distance from the first axis A1 to the one end 31 is less than the distance from the first axis A1 to the center 32.

The shape and layout of the flange 30 may be matched with the opening OP1 for installation of the robot 2 into the chamber 90. Therefore, both reduction of the opening OP1 for installing the robot 2 into the chamber 90 and workability of installation of the robot 2 into the chamber 90 may be achieved.

The chamber 90 may further include a second opening OP2 that is smaller in size than the opening OP1 and provided in the top plate 91 and a lid member 98 that covers the second opening OP2. By making the articulated arm 3 accessible into the conveyance space S01 from above while preventing the intrusion of dust into the chamber 90, the maintainability of the robot 2 can be improved. When viewed from vertically above, at least a part of the second opening OP2 may overlap the articulated arm 3. The maintainability of the robot 2 can be further improved.

As illustrated in FIG. 1, the long L1 in the longitudinal orientation D1 of the flange 30 may be larger than the length L2 of the first link 50. The shape and layout of the flange 30 may further be matched to the opening OP1. The width W1 of the flange 30 may be less than the length L2 of the first link 50. The shape and layout of the flange 30 may further be matched to the opening OP1.

The longitudinal orientation D11 of the chamber 90 may be aligned with the longitudinal orientation D1 of the flange 30. Expansion of the chamber 90 for providing the opening OP1 may be prevented. Being aligned includes being parallel to each other, for example.

The first axis Ax1 may be located closer to the side wall 96 (first side wall) between the side wall 96 (first side wall) and the side wall 97 (second side wall). For example, a distance from the first axis Ax1 to the side wall 96 is less than a distance from the first axis Ax1 to the side wall 97. The first axis Ax1 may be located closer to the side wall 97 (first side wall) between the side wall 97 (first side wall) and the side wall 96 (second side wall). For example, a distance from the first axis Ax1 to the side wall 97 is less than a distance from the first axis Ax1 to the side wall 96. Both of reduction of the chamber 90 and a movable range of the robot 2 may be achieved.

The length L2 of the first link 50 may be less than the distance W11 between the side wall 96 and the side wall 97 and greater than half of the distance W11. Both reduction of the chamber 90 and the movable range of the robot 2 may be further achieved.

Figure 3:
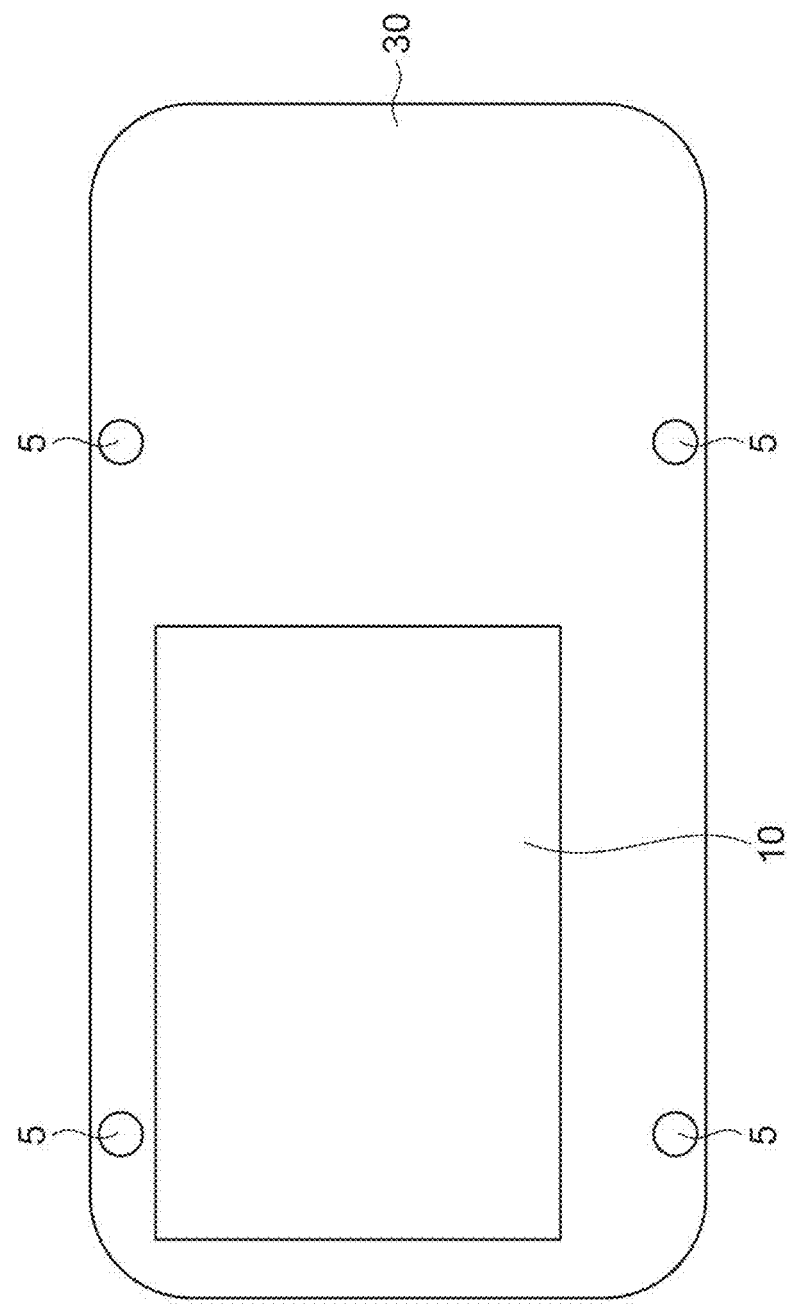
FIG. 3 is a bottom view of a robot illustrated in FIG. 2.

As illustrated in FIGS. 2 and 3, the robot 2 may further include a plurality of leg portions 5. The plurality of leg portions 5 protrude downward from a plurality of locations surrounding the base 10 in the flange 30 farther than the base 10. For example, a height from the flange 30 of each of the leg portions 5 is greater than a height from the flange 30 of the base 10. In the illustrated example, the robot 2 includes four leg portions 5, but the number of the leg portions 5 is not limited thereto. The number and layout of the leg portion 5 may be modified as long as the flange 30 may be supported by standing the plurality of leg portions 5 on the floor surface.

The robot 2 before installation into the chamber 90 may be supported by the leg portion 5 so that the base 10 is not grounded. Therefore, the maintainability of the robot 2 may be improved.

Figure 4:
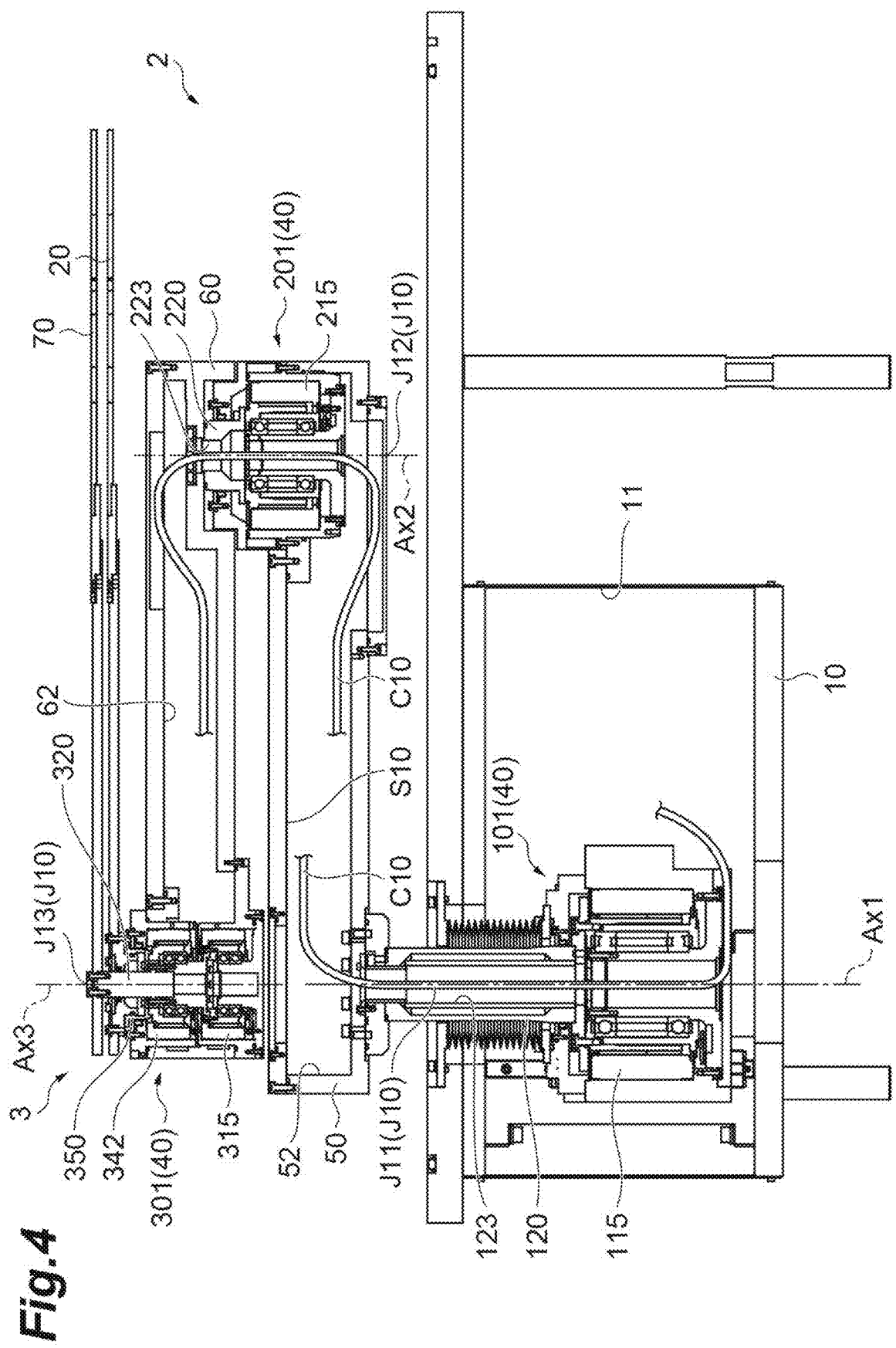
FIG. 4 is a cross-sectional view taken along line IV-IV in FIG. 1.

As illustrated in FIG. 4, each of the plurality of actuators 40 may be arranged in the joint J10 to be driven. Being arranged in the joint J10 means being arranged at a position through which an axis serving as an operation center of the joint J10 passes. For example, the arm actuator 41 is placed at a position where the first axis Ax1 of the first joint J11 passes, the arm actuator 42 is placed at a position where the second axis Ax2 of the second joint J12 passes, and the hand actuator 43 is placed at a position where the third axis Ax3 of the third joint J13 passes.

Each of the plurality of actuators 40 may include a motor such as an electric servo motor. The motor included in each of the plurality of actuators 40 may be a direct drive motor.

The "direct drive motor" in the robot 2 is a motor in which a rotor that rotates by directly receiving an action of a rotating magnetic field is fixed to a link of the articulated arm 3 that is a driving target. Fixing of the rotor to the link is not limited to direct fixing, and may be fixing via another member. At least the link and the rotor may be fixed to each other so as not to move relative to each other.

With the configuration in which the motor included in each of the plurality of actuators 40 is a direct drive motor, since each of the joints J10 is driven without a movable transmission element such as a gear or a belt, the positioning accuracy of the electronic substrate W may be improved.

For example, the arm actuator 41 includes an arm motor 101 (base motor, first arm motor) that is a direct drive motor, the arm actuator 42 includes an arm motor 201 (second arm motor) that is a direct drive motor, and the hand actuator 43 includes a hand motor 301 that is a direct drive motor.

The robot 2 may further include a wiring space S10 and a cable C10. The wiring space S10 is sealed inside the chamber 90 (inside the conveyance space S01) and is formed inside the articulated arm 3 so as to communicate with the outside of the chamber 90. For example, the wiring space S10 is separated from the conveyance space S01 (an inner space of the chamber 90) with an airtight seal. The cable C10 is wired from outside the conveyance space S01 to an actuator 40 located in the conveyance space S01 among the plurality of actuators 40 via the wiring space S10. For example, the cable C10 is partially located outside the chamber 90 and is wired, via the wiring space S10, to the actuator 40 located inside the chamber 90. Even when the inside of the conveyance space S01 is evacuated, since the inside of the wiring space S10 is maintained at an air pressure outside the conveyance space S01, gas generation from the cable C10 into the conveyance space S01 is prevented.

The wiring space S10 being sealed in the conveyance space S01 means that the inside of the wiring space S10 is isolated from the outside of the wiring space S10 in an airtight state in the conveyance space S01. For example, the wiring space S10 includes an internal space 11 of the base 10, an internal space 52 of the first link 50, and an internal space 62 of the second link 60. The internal space 11, the internal space 52, and the internal space 62 are in communication with each other, and the internal space 11 is in communication with the outside of the conveyance space S01. The robot 2 may include the plurality of cables C10 wired from a controller outside the conveyance space S01 to each of the plurality of actuators 40 via the wiring space S10.

Each of the plurality of joints J10 connects a base-side link leading to an end of the base 10 and a hand-side link leading to an end of the hand 20 in the articulated arm 3. Leading to the end of the base 10 includes leading to the end of the base 10 via another link. Leading to the end of the hand 20 includes leading to the end of the hand 20 via another link. The base-side link leading to the end of the base 10 includes the base 10 itself. The hand-side link leading to the end of the hand 20 includes the hand 20 itself.

For example, the first joint J11 connects the base 10 (base-side link) and the first link 50 (hand-side link). The second joint J12 connects the first link 50 (base-side link) and the second link 60 (hand-side link). The third joint J13 connects the second link 60 (base-side link) and the hand 20 (hand-side link).

The motor included in each of the plurality of actuators 40 includes: a stator fixed to the base-side link; and an output shaft that is fixed to the hand-side link and rotates around an axis of the joint J10 by a rotating magnetic field generated by the stator.

For example, the arm motor 101 includes: a stator 115 fixed to the base 10; and an output shaft 120 that is fixed to the first link 50 and rotates around the first axis Ax1 of the first joint J11 by a rotating magnetic field generated by the stator 115. The arm motor 201 includes: a stator 215 fixed to the first link 50; and an output shaft 220 that is fixed to the second link 60 and rotates around the second axis Ax2 of the second joint J12 by a rotating magnetic field generated by the stator 215. The hand motor 301 includes: a stator 342 fixed to the second link 60; and an output shaft 350 that is fixed to the hand 20 and rotates around the third axis Ax3 of the third joint J13 by a rotating magnetic field generated by the stator 342. By fixing the stator of each motor to the base-side link, the wiring path to each motor may be shortened. Shortening the wiring path to each motor also contributes to further prevention of gas generated from each cable C10.

The arm motor 101 may further include a through-hole 123 that extends through the output shaft 120 and serves as a part of the wiring space S10. The arm motor 201 may further include a through-hole 223 that extends through the output shaft 220 and serves as a part of the wiring space S10. By utilizing the through-hole 123 and the through-hole 223 as a part of the wiring space S10, the wiring space S10 may be formed while preventing an increase in size of the articulated arm 3.

The articulated arm 3 may further include a second hand 70 that rotates around the third axis Ax3 (hand axis) that is common with the axis of the hand 20. The second hand 70 supports the electronic substrate W horizontally, similarly to the hand 20.

The hand motor 301 may be a two-axis direct drive motor that rotates the hand 20 and the second hand 70 independently. Both positioning accuracy and downsizing may be achieved.

Hereinafter, configurations of the arm motor 101 (first arm motor) and its surroundings, the arm motor 201 (second arm motor) and its surroundings, and the hand motor 301 and its surroundings will be further illustrated.

First Arm Motor

Figure 5:
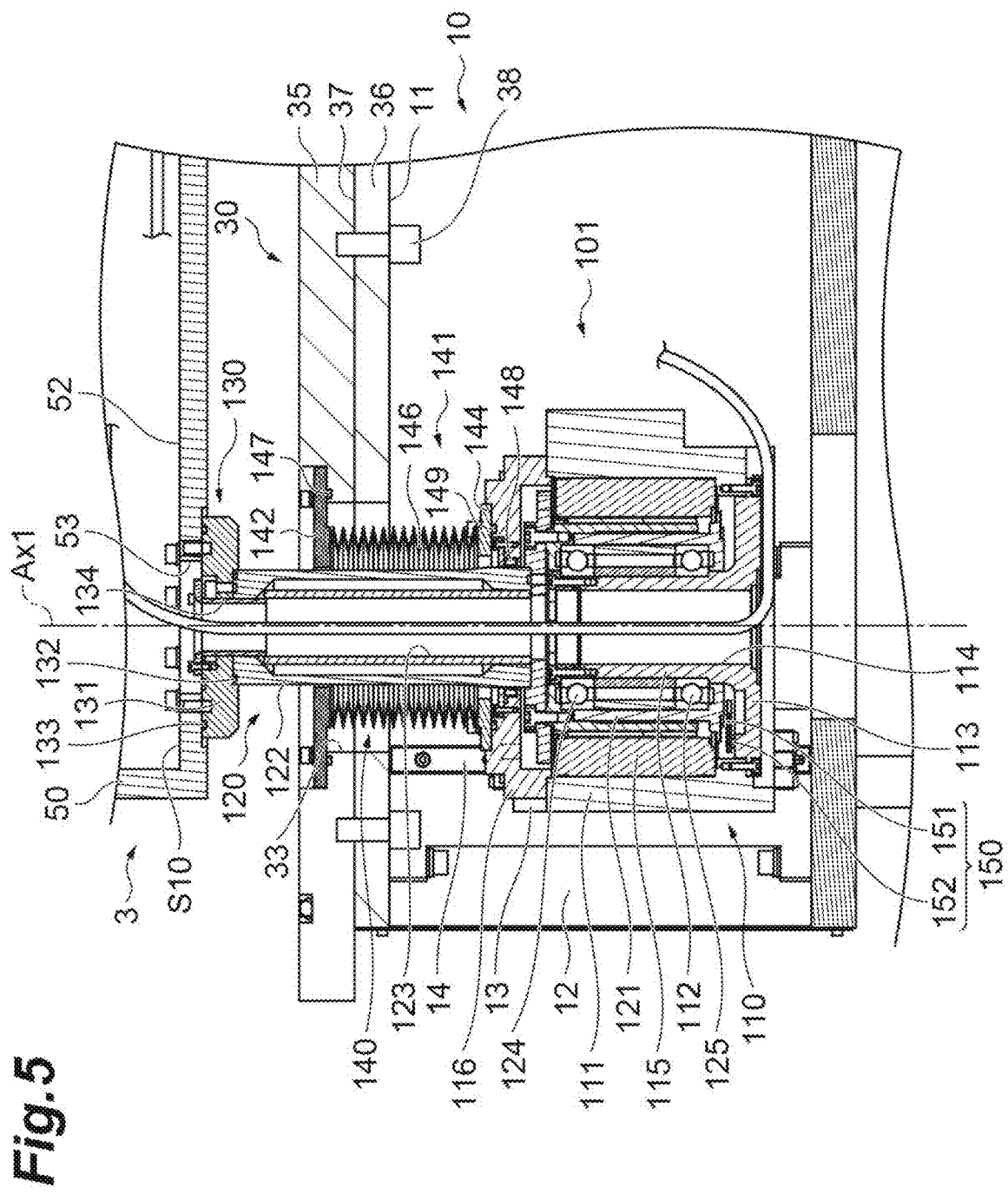
FIG. 5 is an enlarged view of an example first arm motor in FIG. 4.

As illustrated in FIG. 5, the base 10 includes a base housing 12 that includes the internal space 11 that is open upward. The flange 30 is attached to the base housing 12 so as to cover the opening of the internal space 11 upward and protrudes outward from the base housing 12 over the entire circumference. The arm motor 101 is provided in the internal space 11 of the base 10 below the flange 30. The arm motor 101 is provided in the internal space 11 below the flange 30. The arm motor 101 is a radial gap motor and includes a main body 110, the output shaft 120, bearings 124, 125, a motor cover 116, and a rotation sensor 150. The output shaft 120 protrudes upward from within the internal space 11, extends through the flange 30, and is secured to the first link 50. For example, the flange 30 includes an opening 33 that opens upward and downward, and the output shaft 120 protrudes out of the internal space 11 through the opening 33 and is secured to the first link 50. The main body 110 is secured to the base 10 in the internal space 11 and causes the output shaft 120 to rotate around the first axis Ax1 by a rotating magnetic field around the first axis Ax1.

The main body 110 includes a motor housing 111, a fixed shaft 112, a through-hole 114, and the stator 115. The motor housing 111 is open upward and downward, contains the other components of the main body 110, and is secured to the base 10. The fixed shaft 112 is placed in the motor housing 111 and secured to the motor housing 111 so as to extend along the first axis Ax1. For example, the fixed shaft 112 includes a flange 113 that extends to the outside of the inner circumference of the motor housing 111 over the entire circumference under the motor housing 111, and the flange 113 is fixed to the motor housing 111 by bolt fastening or the like.

The fixed shaft 112 may include the through-hole 114 that is open upward and downward along the first axis Ax1. The stator 115 has a cylindrical shape and is housed in the motor housing 111 so as to surround the fixed shaft 112. The stator 115 includes a yoke fixed to an inner peripheral surface of the motor housing 111 by shrink fitting or the like, for example, and a plurality of coils provided in the yoke so as to surround the fixed shaft 112 and generating a rotating magnetic field in response to supply of electric power.

The output shaft 120 includes a rotor 121 and a protruding shaft 122. The rotor 121 has a cylindrical shape and is housed in the motor housing 111 so as to surround the fixed shaft 112 inside the stator 115. The rotor 121 includes, for example, a core and a plurality of permanent magnets provided in the core so as to surround the fixed shaft 112. The rotor 121 and the stator 115 face each other in a radial direction perpendicular to the first axis Ax1 and directly receive the action of the rotating magnetic field generated by the stator 115.

The protruding shaft 122 is fixed to the upper end of the rotor 121, protrudes upward, extends through the flange 30, and is fixed to the first link 50. The arm motor 101 may include the through-hole 123 that extends through the protruding shaft 122 along the first axis Ax1 and communicates the internal space 11 of the base 10 with the internal space 52 of the first link 50.

For example, in the first link 50, an opening 53 is formed that communicates the through-hole 123 with the internal space 52. The through-hole 123 also communicates with the internal space 11 of the base 10 via the through-hole 114. This allows the through-hole 123 and the through-hole 114 to become part of the wiring space S10 and the internal space 52 of the first link 50 to communicate with the internal space 11 of the base 10.

The bearings 124, 125 are, for example, ball-type radial bearings, and are vertically arranged between an outer peripheral surface of the fixed shaft 112 and an inner peripheral surface of the rotor 121. Each of the bearings 124, 125 is held by the fixed shaft 112 and holds the rotor 121 so as to rotate around the first axis Ax1.

The motor cover 116 covers the upward opening of the motor housing 111 at the outer periphery of the protruding shaft 122. The motor cover 116 extends from the protruding shaft 122 to the outside of the inner circumference of the motor housing 111 over the entire circumference on the motor housing 111, and is fixed to the motor housing 111 from above by bolt fastening or the like.

The rotation sensor 150 detects rotation of the output shaft 120. For example, the rotation sensor 150 is a rotary encoder and includes a disk 151 and a sensor head 152 that are installed in the motor housing 111. The disk 151 holds a pulse pattern arranged circumferentially around the first axis Ax1 and is mounted below the rotor 121. The sensor head 152 is an optical sensor that reads the pulse pattern of the disk 151 at a fixed position in the motor housing 111. The sensor head 152 generates a pulse signal corresponding to the pulse pattern that is read. The sensor head 152 is attached to the flange 113 of the fixed shaft 112, for example. For example, the rotation sensor 150 outputs a detection data indicating the rotation position (rotation angle) of the output shaft 120 as the detection result of the rotation of the output shaft 120 based on the count result of the pulse signal generated by the sensor head 152.

The robot 2 may further include a hand-side seal member 130 that seals between the first link 50 (hand-side link) and the protruding shaft 122 and a base-side seal member 140 that seals between the base 10 (base-side link) and the protruding shaft 122 corresponding to the arm motor 101. The wiring space S10 may readily be sealed.

Sealing between the first link 50 and the protruding shaft 122 means substantially preventing communication between the conveyance space S01 and the wiring space S10 via a gap between the first link 50 and the protruding shaft 122. Sealing between the base 10 and the protruding shaft 122 means substantially preventing communication between the conveyance space S01 and the wiring space S10 via a gap between the base 10 and the protruding shaft 122. Communication between the conveyance space S01 and the wiring space S10 includes communication between the conveyance space S01 and the wiring space S10 via the outside of the conveyance space S01.

The hand-side seal member 130 includes a flange 131, an inner seal 132, and an outer seal 133. The flange 131 is attached to the end of the protruding shaft 122 by bolt fastening or the like, extends outward from the inner circumference of the opening 53 of the first link 50 over the entire circumference, and is fixed to the first link 50 by bolt fastening or the like. The flange 131 includes a through-hole 134 that communicate the opening 53 of the first link 50 with the through-hole 123 of the protruding shaft 122.

The inner seal 132 seals between the protruding shaft 122 and the flange 131. The inner seal 132 is, for example, an O-ring, is disposed between the protruding shaft 122 and the flange 131 so as to surround the through-hole 123 and the through-hole 134, and is in airtight contact with the protruding shaft 122 and the flange 131 over the entire circumference.

The outer seal 133 seals between the first link 50 and the flange 131. The outer seal 133 is, for example, an O-ring, is disposed between the flange 131 and the first link 50 so as to surround the opening 53 and the through-hole 134, and is in airtight contact with the flange 131 and the first link 50 over the entire circumference.

The base-side seal member 140 seals between the flange 30 and the protruding shaft 122. Sealing between the flange 30 and the protruding shaft 122 means substantially preventing communication between the conveyance space S01 and the wiring space S10 via a gap between the flange 30 and the protruding shaft 122.

The base-side seal member 140 may include a mechanical seal that closely contacts the protruding shaft 122 while allowing rotation of the protruding shaft 122 relative to the base 10. A mechanical seal is a seal that seals between two members that rotate relative to each other. The mechanical seal includes a fixed ring fixed to one member and a rotating ring fixed to the other member, and seals between the one member and the other member while allowing rotation of the other member relative to the one member at a contact surface between the fixed ring and the rotating ring.

By employing the mechanical seal, the wiring space S10 may be sealed with a small driving resistance. Accordingly, both positioning accuracy and sealing of the wiring space S10 may be achieved.

The base-side seal member 140 may be attached to the base 10 in a detachable state separately from the main body 110. The base-side seal member 140 may wear due to friction with the protruding shaft 122, but the worn base-side seal member 140 may be detached and readily replaced separately from the main body 110. Accordingly, both prevention of gas generation in the chamber 90 and maintainability may be achieved. The detachable state means that the device may be detached in a non-destructive manner by releasing bolt fastening or the like.

For example, the base-side seal member 140 includes a cover 141, an outer seal 147, and an inner seal 148. The cover 141 is attached to the base 10 from the outside. For example, the cover 141 is attached to the flange 30. The outer seal 147 seals between the cover 141 and the base 10. The outer seal 147 seals between the cover 141 and the flange 30. The inner seal 148 seals between the cover 141 and the protruding shaft 122 while allowing rotation of the protruding shaft 122 relative to the cover 141. The inner seal 148 may be a mechanical seal as described above. With the configuration in which the base-side seal member 140 includes the cover 141, the outer seal 147, and the inner seal 148, both reliability of sealing and maintainability of the base-side seal member 140 may be achieved.

Sealing between the cover 141 and the flange 30 by the outer seal 147 may not be limited to bringing the outer seal 147 into airtight contact with both the cover 141 and the flange 30. For example, sealing between the cover 141 and the flange 30 may include bringing the outer seal 147 into airtight contact with a separate member that is hermetically connected to the cover 141 and with the flange 30. Sealing between the cover 141 and the protruding shaft 122 by the inner seal 148 may not be limited to bringing the inner seal 148 into airtight contact with both the cover 141 and the protruding shaft 122. For example, sealing between the cover 141 and the protruding shaft 122 may include bringing the inner seal 148 into airtight contact with a separate member that is hermetically connected to the cover 141 and with the protruding shaft 122.

As an example, the cover 141 may be hermetically connected to the motor cover 116 and the inner seal 148 may seal between the cover 141 and the protruding shaft 122 by sealing against the motor cover 116 and the protruding shaft 122. For example, when the inner seal 148 is the above-described mechanical seal, a fixed ring of the inner seal 148 may be held in airtight contact with the inner periphery of the motor cover 116, and a rotating ring of the inner seal 148 may be held in airtight contact with the outer periphery of the protruding shaft 122.

The base 10 may include a motor holder 13 and a lifting actuator 14. The main body 110 is fixed to the motor holder 13. For example, the motor housing 111 may be fixed to the motor holder 13. The lifting actuator 14 is fixed to the flange 30 in the internal space 11 and raises and lowers the motor holder 13. Accordingly, the main body 110 including the stator 115 is raised and lowered. Examples of the lifting actuator 14 include ball-screw linear actuators.

The lifting actuator 14 raises and lowers the main body 110, thereby raising and lowering the arm 4 and the hand 20 in the conveyance space S01. Thus, the electronic substrate W may be conveyed between the conveyance source and the conveyance destination having different heights.

If the base 10 includes the lifting actuator 14, the cover 141 may be configured to expand and contract in response to the elevation of the main body 110 by the lifting actuator 14. Both the movability of the protruding shaft 122 in both of an lifting direction and a rotating direction and the sealability of the conveyance space S01 may be achieved.

If the inner seal 148 is a mechanical seal, the cover 141 seals between the mechanical seal and the flange 30 and acts as a stretchable seal that expands and contracts as the main body 110 moves up and down with the mechanical seal. As described above, the mechanical seal includes a fixed ring and a rotating ring. The fixed ring is fixed to the cover 141, and the rotating ring is fixed to the protruding shaft 122. Since the fixed ring and the rotating ring may be kept in contact with each other, the rotating ring in airtight contact with the protruding shaft 122 may not be raised and lowered relative to the fixed ring in airtight contact with the cover 141. When the cover 141 functions as a stretchable seal, both the fixed ring in airtight contact with the cover 141 and the rotating ring in airtight contact with the protruding shaft 122 may be raised and lowered by the expansion and contraction of the cover 141.

In this manner, by combining the mechanical seal and the stretchable seal, the wiring space S10 may be sealed while suppressing the driving resistance in both the lifting direction and the rotating direction to be small. Accordingly, both positioning accuracy and sealing of the wiring space S10 may be achieved.

For example, the cover 141 includes a first cover 142, a second cover 144, a middle seal 149, and a stretchable portion 146. The first cover 142 surrounds the protruding shaft 122, extends from the protruding shaft 122 to the outside of the inner circumference of the opening 33 over the entire circumference, and is attached to the flange 30 from above by bolt fastening or the like. Being attached to the flange 30 from above is included in being attached to the base 10 from outside the base 10 (base-side link).

The second cover 144 surrounds the protruding shaft 122 below the first cover 142, extends around the entire circumference from the protruding shaft 122 to outside the inner circumference of the motor cover 116, and is attached to the motor cover 116 from above by bolt fastening or the like. The outer radius of the second cover 144 may be smaller than the inner radius of the opening 33. This allows the entire the cover 141 to be attached from above the flange 30 via the opening 33.

The outer seal 147 described above seals between the first cover 142 and the flange 30. For example, the outer seal 147 is an O-ring, is disposed between the first cover 142 and the flange 30 so as to surround the protruding shaft 122, and is in airtight contact with the first cover 142 over the entire circumference. The middle seal 149 seals between the second cover 144 and the motor cover 116. For example, the middle seal 149 is an O-ring, is disposed between the second cover 144 and the motor cover 116 so as to surround the protruding shaft 122, and is in airtight contact with the second cover 144 and the motor cover 116 over the entire circumference.

The stretchable portion 146 is a bellows-like hose that surrounds the protruding shaft 122 between the first cover 142 and the second cover 144, and expands and contracts in response to lifting and lowering of the main body 110 due to the lifting actuator 14. The upper end of the stretchable portion 146 is hermetically connected to the first cover 142 over the entire circumference, and the lower end of the stretchable portion 146 is hermetically connected to the second cover 144 over the entire circumference.

The flange 30 may include a first flange 35, a second flange 36, an adjustment plate 37, and a plurality of fastening members 38. The first flange 35 faces into the chamber 90 (the conveyance space S01). For example, the first flange 35 faces upwards. The second flange 36 underlies the first flange 35 and faces out of the chamber 90. For example, the second flange 36 faces downward. The adjustment plate 37 is inserted between the first flange 35 and the second flange 36 to adjust the inclination of the second flange 36 relative to the first flange 35. The plurality of fastening members 38 fasten the second flange 36 to the first flange 35.

The lifting actuator 14 may be fixed to the second flange 36. The opening 33 may be formed to extend through both the first flange 35 and the second flange 36, and the protruding shaft 122 may extend through the second flange 36 and the first flange 35 and be fixed to the first link 50.

With the configuration in which the second flange 36 is fastened to the first flange 35 with the adjustment plate 37 interposed therebetween, the inclination of the second flange 36 relative to the first flange 35 may be adjusted by partially disposing the adjustment plate 37 between the second flange 36 and the first flange 35 and changing the position, shape, size, and the like of the adjustment plate 37. Since the lifting actuator 14 is fixed to the second flange 36, the installation posture of the robot 2 in the conveyance space S01 is adjusted by adjusting the inclination of the second flange 36 relative to the first flange 35. In this way, the flange 30 may be used to adjust the installation posture of the robot 2.

The base-side seal member 140 may seal between the inner seal 148 and the first flange 35. For example, the first cover 142 is attached to the first flange 35 from above. The outer seal 147 is placed between the first cover 142 and the first flange 35 so as to surround the protruding shaft 122, and is in airtight contact with the first cover 142 and the first flange 35 over the entire circumference.

A change in inclination of the second flange 36 relative to the first flange 35 may readily be absorbed by the stretchable seal and sealing performance between the inside of the conveyance space S01 and the outside of the conveyance space S01 may be maintained.

Each of the first flange 35 and the second flange 36 may partition between the base 10, and the arm 4 and the hand 20, and the first flange 35 may extend from the periphery of the second flange 36 all around. By providing each of the first flange 35 and the second flange 36 with a spread for partitioning between the base 10, and the arm 4 and the hand 20, an arrangement margin of the adjustment plate 37 may be secured. In addition, since the second flange 36 is not put in the conveyance space S01, the sealing performance between the inside of the conveyance space S01 and the outside of the conveyance space S01 may readily be maintained.

Second Arm Motor

Figure 6:
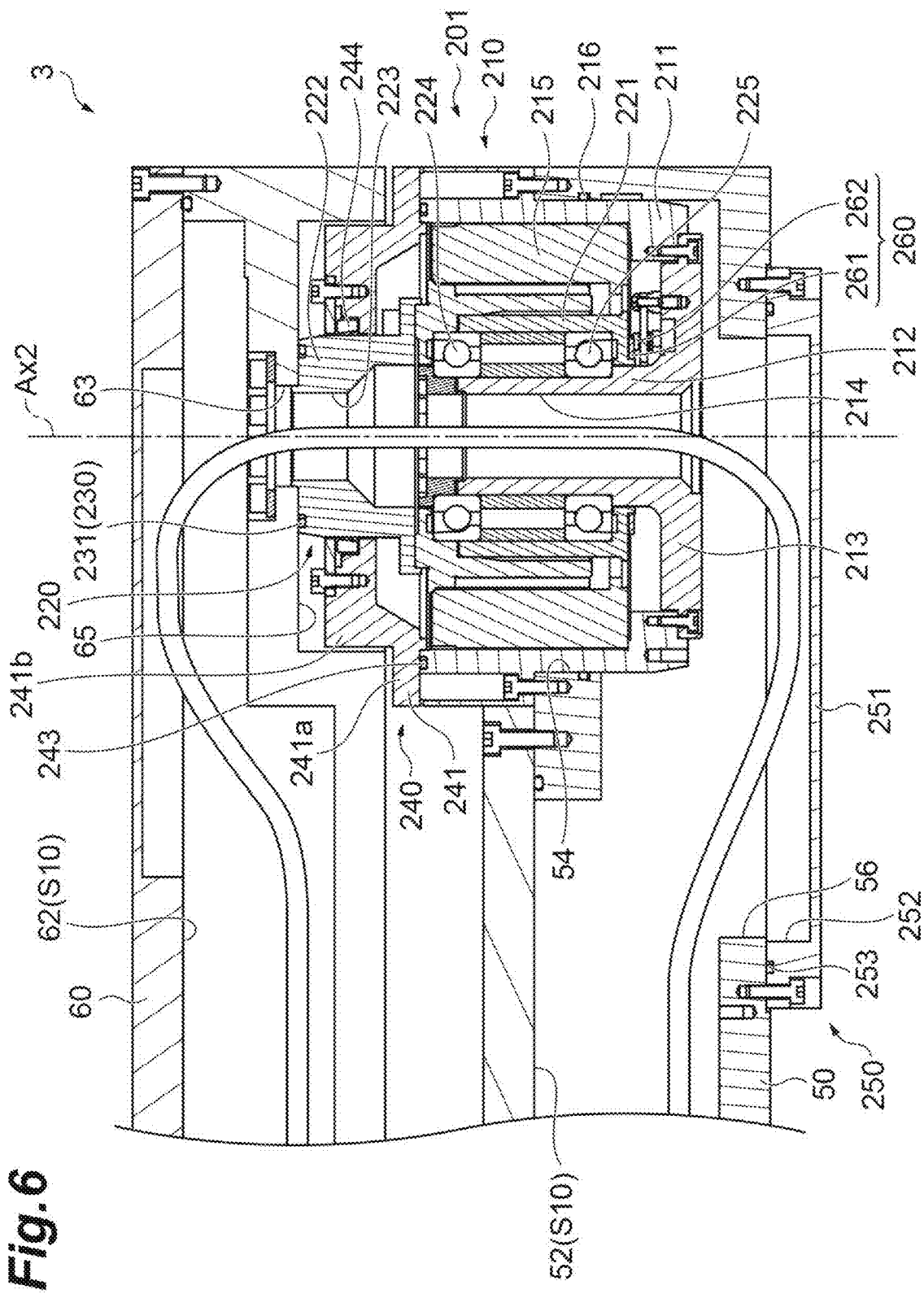
FIG. 6 is an enlarged view of an example second arm motor in FIG. 4.

As illustrated in FIG. 6, the second link 60 is located above the first link 50. The first link 50 includes an upwardly open opening 54. At least a part of the arm motor 201 is received in the internal space 52 from above through the opening 54.

The arm motor 201 is a radial gap motor and includes a main body 210, the output shaft 220, bearings 224, 225, and a rotation sensor 260. The output shaft 220 projects upwardly from within the internal space 52 and is fixed to the second link 60. The main body 210 is secured to the first link 50 and rotates the output shaft 220 around the second axis Ax2 by a rotating magnetic field around the second axis Ax2.

The main body 210 includes a motor housing 211, a fixed shaft 212, a through-hole 214, the stator 215, and a motor seal 216. The motor housing 211 is open upward and downward, contains the other components of the main body 210, and is fixed to the first link 50. For example, the motor housing 211 is attached to the first link 50 from above by bolt fastening or the like around the opening 54. The fixed shaft 212 is placed in the motor housing 211 and fixed to the motor housing 211 so as to extend along the second axis Ax2. For example, the fixed shaft 212 includes a flange 213 that extends to the outside of the inner circumference of the motor housing 211 over the entire circumference under the motor housing 211, and the flange 213 is fixed to the motor housing 211 by bolt fastening or the like. The fixed shaft 212 may include the through-hole 214 that opens upwardly and downwardly along the second axis Ax2.

The stator 215 includes a cylindrical shape and is housed in the motor housing 211 so as to surround the fixed shaft 212. The stator 215 includes a yoke fixed to an inner peripheral surface of the motor housing 211 by shrink fitting or the like, for example, and a plurality of coils provided in the yoke so as to surround the fixed shaft 212 and generating a rotating magnetic field in response to supply of electric power.

The motor seal 216 seals between the motor housing 211 and the first link 50. For example, the motor seal 216 is an O-ring, is disposed between the outer peripheral surface of the motor housing 211 and the inner peripheral surface of the opening 54, and is in airtight contact with the outer peripheral surface of the motor housing 211 and the inner peripheral surface of the opening 54 over the entire circumference.

The output shaft 220 includes a rotor 221 and a protruding shaft 222. The rotor 221 has a cylindrical shape and is housed in the motor housing 211 so as to surround the fixed shaft 212 inside the stator 215. The rotor 221 includes, for example, a core and a plurality of permanent magnets provided in the core so as to surround the fixed shaft 212. The rotor 221 faces the stator 215 in a radial direction perpendicular to the second axis Ax2, and is directly affected by the rotating magnetic field generated by the stator 215.

The protruding shaft 222 is fixed to the upper end of the rotor 221, protrudes upward, and is fixed to the second link 60. The arm motor 201 may include the through-hole 223 that extends through the protruding shaft 222 along the second axis Ax2 and communicates the internal space 52 of the first link 50 with the internal space 62 of the second link 60.

For example, in the second link 60, an opening 63 is formed that communicates the through-hole 223 with the internal space 62. The through-hole 223 also communicates with the internal space 52 of the first link 50 via the through-hole 214. This allows the through-hole 223 and the through-hole 214 to become a part of the wiring space S10 and the internal space 62 in the second link 60 to communicate with the internal space 52 of the first link 50.

The bearings 224, 225 are, for example, ball type radial bearings, and vertically arranged between the outer peripheral surface of the fixed shaft 212 and the inner peripheral surface of the rotor 221. Each of the bearings 224, 225 is held by the fixed shaft 212 and holds the rotor 221 to rotate around the second axis Ax2.

The rotation sensor 260 detects rotation of the output shaft 220. For example, the rotation sensor 260 includes a disk 261 and a sensor head 262 located in the motor housing 211. The disk 261 holds a pulse pattern arranged circumferentially around the second axis Ax2 and is mounted below the rotor 221. The sensor head 262 is an optical sensor that reads the pulse pattern of the disk 261 at a fixed position in the motor housing 211. The sensor head 262 generates a pulse signal corresponding to the pulse pattern that is read. The sensor head 262 is attached to the flange 213 of the fixed shaft 212, for example. For example, the rotation sensor 260 outputs a detection data indicating the rotation position (rotation angle) of the output shaft 220 as the detection result of the rotation of the output shaft 220 based on the count result of the pulse signal generated by the sensor head 262.

The robot 2 may further include a hand-side seal member 230 that seals between the second link 60 (hand-side link) and the protruding shaft 222 and a base-side seal member 240 that seals between the first link 50 (base-side link) and the protruding shaft 222 corresponding to the arm motor 201. The wiring space S10 may readily be sealed.

Sealing between the second link 60 and the protruding shaft 222 means substantially preventing communication between the conveyance space S01 and the wiring space S10 via a gap between the second link 60 and the protruding shaft 222. Sealing between the first link 50 and the protruding shaft 222 means substantially preventing communication between the conveyance space S01 and the wiring space S10 via a gap between the first link 50 and the protruding shaft 222.

The hand-side seal member 230 includes an edge seal 231. The edge seal 231 is, for example, an O-ring, is disposed between the protruding shaft 222 and the second link 60 so as to surround the through-hole 223 and the opening 63, and is in airtight contact with the protruding shaft 222 and the second link 60 over the entire circumference.

The base-side seal member 240 seals between the first link 50 and the protruding shaft 222. Sealing between the first link 50 and the protruding shaft 222 means substantially preventing communication between the conveyance space S01 and the wiring space S10 via a gap between the first link 50 and the protruding shaft 222.

The base-side seal member 240 may include a mechanical seal that is in airtight contact with the protruding shaft 222 while allowing rotation of the protruding shaft 222 relative to the first link 50. By employing the mechanical seal, the wiring space S10 may be sealed with a small driving resistance. Accordingly, both positioning accuracy and sealing of the wiring space S10 may be achieved. Sealing between the first link 50 and the protruding shaft 222 may not be limited to bringing the base-side seal member 240 into airtight contact with both the first link 50 and the protruding shaft 222. For example, sealing between the first link 50 and the protruding shaft 222 includes bringing the base-side seal member 240 into airtight contact with a separate member that is hermetically connected to the first link 50 and with the protruding shaft 222.

As described above, the motor housing 211 is hermetically connected to the first link 50 by the motor seal 216. Thus, the base-side seal member 240 may seal between the first link 50 and the protruding shaft 222 by closely contacting the motor housing 211 and the protruding shaft 222.

The base-side seal member 240 may be attached to the first link 50 in a detachable state separately from the main body 210. The base-side seal member 240 may wear due to friction with the protruding shaft 222, but the worn base-side seal member 240 may readily be detached and replaced separately from the main body 210. Accordingly, both prevention of gas generation in the chamber 90 and maintainability may be achieved.

For example, the base-side seal member 240 includes a cover 241, an outer seal 243, and an inner seal 244. The cover 241 is attached to the first link 50 from the outside.

The outer seal 243 seals between the cover 241 and the first link 50. The inner seal 244 seals between the cover 241 and the protruding shaft 222 while allowing rotation of the protruding shaft 222 relative to the cover 241. With the configuration in which the base-side seal member 240 includes the cover 241, the outer seal 243, and the inner seal 244, it is possible to achieve both reliability of sealing and maintainability of the base-side seal member 240.

Attaching the cover 241 to the first link 50 may not be limited to attaching the cover 241 directly to the first link 50.

For example, attaching the cover 241 to the first link 50 may include attaching the cover 241 to a separate member fixed to the first link 50. For example, the cover 241 surrounds the protruding shaft 222, extends outward from the inner circumference of the motor housing 211 over the entire circumference, and is attached to the motor housing 211 from above by bolt fastening or the like.

Sealing between the cover 241 and the first link 50 by the outer seal 243 may not be limited to bringing the outer seal 243 into airtight contact with both the cover 241 and the first link 50. For example, sealing between the cover 241 and the first link 50 may include bringing the outer seal 243 into airtight contact with a separate member that is hermetically connected to the first link 50 and with the cover 241. For example, the outer seal 243 is an O-ring, is disposed between the motor housing 211 and the cover 241 so as to surround the protruding shaft 222, and is in airtight contact with the motor housing 211 and the cover 241 over the entire circumference.

The inner seal 244 is disposed between the outer peripheral surface of the cover 241 and the inner peripheral surface of the protruding shaft 222, and is in airtight contact with the cover 241 and the protruding shaft 222 over the entire periphery. For example, the inner seal 244 is the mechanical seal described above, the fixed ring of the inner seal 244 is held so as to be in airtight contact with the inner peripheral surface of the cover 241, and the rotating ring of the inner seal 244 is held so as to be in airtight contact with the outer peripheral surface of the protruding shaft 222.

Sealing between the cover 241 and the protruding shaft 222 by the inner seal 244 may not be limited to bringing the inner seal 244 into airtight contact with both the cover 241 and the protruding shaft 222. For example, sealing between the cover 241 and the protruding shaft 222 may include bringing the inner seal 244 into airtight contact with a separate member that is hermetically connected to the cover 241 and with the protruding shaft 222.

The cover 241 may bulge from the first link 50 (first link) towards the second link 60 (second link) and the location of the inner seal 244 may be farther from the first link 50 relative to the location of the outer seal 243 in an orientation along the second axis Ax2. For example, the cover 241 may include a first portion 241a attached to the first link 50 and a second portion 241b protrudes from the first portion 241a toward the second link 60. The outer seal 243 is located between the first portion 241a and the first link 50. The inner seal 244 may be located between the second portion 241b and the protruding shaft 222. The sealing margin by the outer seal 243 and the sealing margin by the inner seal 244 may be secured independently of each other. Therefore, both the reliability of sealing and the maintainability of the base-side seal member 240 may be further achieved.

The second link 60 may further include a recess 65. The recess 65 opens into the first link 50 and receives the cover 241 bulging out of the first link 50. For example, the recess 65 receives the second portion 241b. Enlargement of the robot 2 caused by the seal member may be prevented.

The first link 50 may further include an opening 56. The opening 56 exposes the through-hole 223 to the outside in a direction opposite to the direction in which the second link 60 is located (downward). For example, the opening 56 exposes the trough-hole 223 toward a direction away from the second link 60. The articulated arm 3 may further include a back cover 251 that covers the opening 56. The articulated arm 3 may further include a back seal member 250 that covers the opening 56 so as to seal the through-hole 223 within the internal space 52. By detaching the back seal member 250, a cable or the like may readily be wired from the through-hole 223 into the first link 50.

The back seal member 250 includes the back cover 251 and a cover seal 253. The back cover 251 covers the opening 56 from below by extending to the outside of the inner periphery of the opening 56 over the entire periphery, and is attached to the first link 50 by bolt fastening or the like. The cover seal 253 seals between the back cover 251 and the first link 50. The cover seal 253 is, for example, an O-ring, is disposed between the first link 50 and the back cover 251 so as to surround the opening 56, and is in airtight contact with the first link 50 and the back cover 251 over the entire circumference.

Figure 7:
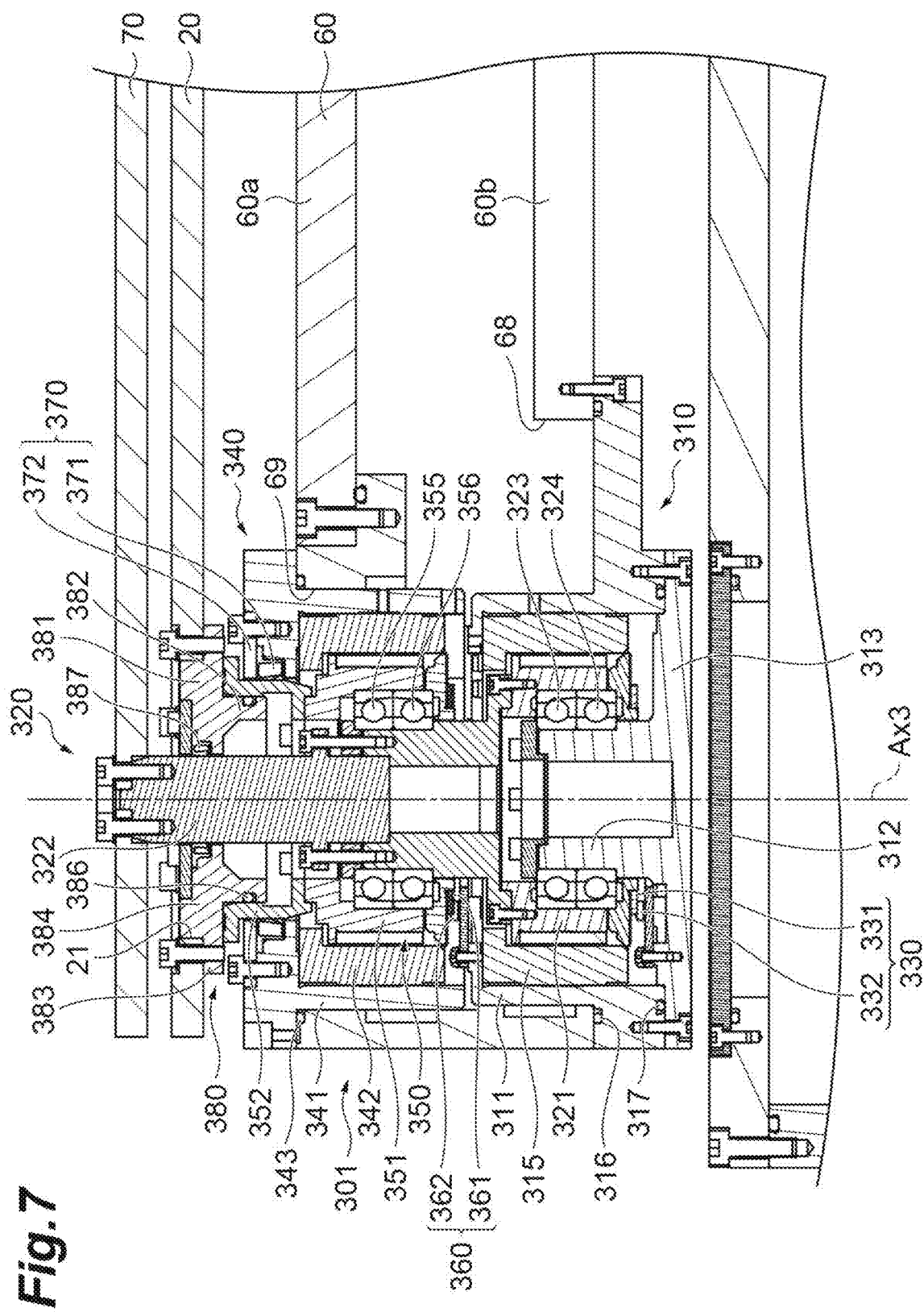
FIG. 7 is an enlarged view of an example hand motor in FIG. 4.

The back cover 251 may include a recess 252 directed into the first link 50. The recess 252 may open toward the output shaft 220. The recess 252 places the through-hole 223 in communication with the internal space 52 of the first link 50. Since the back cover 251 also constitutes a part of the wiring space S10, further space saving of the arm 4 may be achieved. Hand Motor As illustrated in FIG. 7, the hand 20 is positioned above the second link 60 and the second hand 70 is positioned above the hand 20. The hand motor 301 may include: the output shaft 350 (first output shaft); the stator 342 (first stator) that rotates the hand 20 around the third axis Ax3 (hand axis) by applying a rotating magnetic field to the output shaft 350; an output shaft 320 (second output shaft) that extends through the output shaft 350 along the third axis Ax3; and a stator 315 (second stator) that rotates the second hand 70 around the third axis Ax3 by applying a rotating magnetic field to the output shaft 320.

By utilizing the inside of the output shaft 350 as an arrangement space for the output shaft 320, the hand motor 301 may further be miniaturized.

The stator 342 and the stator 315 may be fixed to the second link 60 (base-side link), the output shaft 350 may be fixed to the hand 20, the output shaft 320 may be fixed to the second hand 70 extending through the output shaft 350 and the hand 20, and the stator 342 may be located between the hand 20 and the stator 315. The hand motor 301 may further be miniaturized.

The hand motor 301 may include: a first bearing held by the second link 60 and holding the output shaft 320 or the output shaft 350 to rotate around the third axis Ax3; and a second bearing held by the output shaft 320 between the outer circumference of the output shaft 320 and the inner circumference of the output shaft 350 and holding the output shaft 350 to rotate around the third axis Ax3.

For example, the hand motor 301 includes: bearings 323, 324 that are held by the second link 60 and hold the output shaft 320 to rotate around the third axis Ax3; and bearings 355, 356 that are held by the output shaft 320 and hold the output shaft 350 to rotate around the third axis Ax3.

By utilizing the space between the output shaft 350 and the output shaft 320 as an arrangement space for the bearings, and by making the output shaft 350 and the output shaft 320 to hold each other, both miniaturization and rigidity of the drive system of a plurality of stages of the hand 20 and the second hand 70 may be achieved.

The stator 342 may be attached to the second link 60 from the side where the hand 20 and the second hand 70 are located (for example, above), and the stator 315 may be attached to the second link 60 from the opposite side where the hand 20 and the second hand 70 are located (for example, below). By attaching the stator 315 and the stator 342 from different directions, the assemblability of the robot 2 may be improved.

The hand motor 301 may further include a fixed shaft 312 fixed to the second link 60 and inserted into the output shaft 320 along the third axis Ax3 and the bearings 323, 324 may be held by the fixed shaft 312 and hold the output shaft 320 between the outer circumference of the fixed shaft 312 and the inner circumference of the output shaft 320

The hand motor 301 may be a radial gap motor. For example, the output shaft 320 may face the stator 315 in a radial direction perpendicular to the third axis Ax3 and receive a rotating magnetic field from the stator 315. The output shaft 350 may face the stator 342 in the radial direction and receive a rotating magnetic field from the stator 342.

For example, the hand motor 301 includes a main body 310, the output shaft 320, the bearings 323, 324, a rotation sensor 330, a main body 340, the output shaft 350, the bearings 355, 356, and a rotation sensor 360. The second link 60 includes an opening 68 that is open downwardly. At least a part of the main body 310 is contained in the internal space 62 from below through the opening 68.

The main body 310 includes a motor housing 311, the fixed shaft 312, the stator 315, a motor seal 316, and a motor seal 317. The motor housing 311 is open upward and downward, contains the other components of the main body 310, and is fixed to the second link 60. For example, the motor housing 311 is attached to the second link 60 from below by bolt fastening or the like around the opening 68. The fixed shaft 312 is placed in the motor housing 311 and fixed to the motor housing 311 to extend along the third axis Ax3. For example, the fixed shaft 312 includes a flange 313 that extends to the outside of the inner circumference of the motor housing 311 over the entire circumference under the motor housing 311, and the flange 313 is fixed to the motor housing 311 by bolt fastening or the like.

The stator 315 has a cylindrical shape and is housed in the motor housing 311 so as to surround the fixed shaft 312. The stator 315 includes a yoke fixed to an inner peripheral surface of the motor housing 311 by shrink fitting or the like, for example, and a plurality of coils provided in the yoke so as to surround the fixed shaft 312 and generating a rotating magnetic field in response to supply of electric power.

The motor seal 316 seals between the motor housing 311 and the second link 60. For example, the motor seal 316 is an O-ring, is disposed between the second link 60 and the motor housing 311 so as to surround the opening 68, and is in airtight contact with the second link 60 and the motor housing 311 over the entire circumference. The motor seal 317 seals between the motor housing 311 and the flange 313. For example, the motor seal 317 is an O-ring, is disposed between the motor housing 311 and the flange 313 so as to surround the fixed shaft 312, and is in airtight contact with the motor housing 311 and the flange 313 over the entire circumference.

The output shaft 320 includes a rotor 321 and a protruding shaft 322. The rotor 321 has a cylindrical shape and is housed in the motor housing 311 so as to surround the fixed shaft 312 inside the stator 315. The rotor 321 includes, for example, a core and a plurality of permanent magnets provided in the core so as to surround the fixed shaft 312. The rotor 321 faces the stator 315 in a radial direction perpendicular to the third axis Ax3, and is directly affected by the rotating magnetic field generated by the stator 315. The protruding shaft 322 is fixed to the upper end of the rotor 321, protrudes upward, and is fixed to the second hand 70.

The bearings 323, 324, for example, are ball type radial bearings and vertically arranged between the outer peripheral surface of the fixed shaft 312 and the inner peripheral surface of the rotor 321. Each of the bearings 323, 324 is held by the fixed shaft 312 and holds the rotor 321 so as to rotate around the third axis Ax3.

The rotation sensor 330 detects rotation of the output shaft 320. For example, the rotation sensor 330 is a rotary encoder and includes a disk 331 and a sensor head 332 installed in the motor housing 311. The disk 331 holds a pulse pattern arranged circumferentially around the third axis Ax3 and is mounted below the rotor 321. The sensor head 332 is an optical sensor that reads the pulse pattern of the disk 331 at a fixed position in the motor housing 311. The sensor head 332 generates a pulse signal corresponding to the pulse pattern that is read. The sensor head 332 is attached to the flange 313 of the fixed shaft 312, for example. For example, the rotation sensor 330 outputs a detection data indicating the rotation position (rotation angle) of the output shaft 320 as the detection result of the rotation of the output shaft 320 based on the count result of the pulse signal generated by the sensor head 332.

The second link 60 further includes an opening 69 that is open upwardly. At least a part of the main body 340 is contained in the internal space 62 from above through the opening 69.

The main body 340 includes a motor housing 341, the stator 342, and a motor seal 343. The motor housing 341 opens up and down, houses the other components of the main body 340 and the protruding shaft 322 of the output shaft 320, and is secured to the second link 60. For example, the motor housing 341 is attached to the second link 60 from above by bolt fastening or the like around the opening 69.

The stator 342 has a cylindrical shape and is housed in the motor housing 341 so as to surround the protruding shaft 322. The stator 342 includes a yoke fixed to an inner peripheral surface of the motor housing 341 by shrink fitting or the like, for example, and a plurality of coils provided in the yoke so as to surround the protruding shaft 322 and generating a rotating magnetic field in response to supply of electric power.

The motor seal 343 seals between the motor housing 341 and the second link 60. For example, the motor seal 343 is an O-ring, is disposed between the second link 60 and the motor housing 341 so as to surround the opening 69, and is in airtight contact with the second link 60 and the motor housing 341 over the entire circumference.

The output shaft 350 includes a rotor 351 and a protruding shaft 352. The rotor 351 has a cylindrical shape and is housed in the motor housing 341 so as to surround the protruding shaft 322 inside the stator 342. The rotor 351 includes, for example, a core and a plurality of permanent magnets provided in the core so as to surround the protruding shaft 322. The rotor 351 faces the stator 342 in a radial direction perpendicular to the third axis Ax3, and is directly affected by the rotating magnetic field generated by the stator 342.

The protruding shaft 352 is cylindrical and encloses the protruding shaft 322 between the hand 20 and the rotor 351. The protruding shaft 352 is fixed to the upper end of the rotor 351, protrudes upward, and is fixed to the hand 20.

The bearings 355, 356, for example, are ball type radial bearings and vertically arranged between the inner peripheral surface of the protruding shaft 352 and the outer peripheral surface of the protruding shaft 322. Each of the bearings 355, 356 is held by the protruding shaft 322 and holds the rotor 351 to rotate around the third axis Ax3.

The rotation sensor 360 detects rotation of the output shaft 350. For example, the rotation sensor 360 is a rotary encoder and includes a disk 361 and a sensor head 362. The disk 361 holds a pulse pattern arranged circumferentially around the third axis Ax3 and is mounted below the rotor 351. The sensor head 362 is an optical sensor that reads the pulse pattern of the disk 361 at a fixed position on the main body 340. The sensor head 362 generates a pulse signal corresponding to the pulse pattern that is read. The sensor head 362 is attached to the motor housing 311 of the main body 310, for example. For example, the rotation sensor 360 outputs a detection data indicating the rotation position (rotation angle) of the output shaft 350 as the detection result of the rotation of the output shaft 350 based on the count result of the pulse signal generated by the sensor head 362.

The robot 2 may further include a first hand seal member 370 and a second hand seal member 380 corresponding to the hand motor 301.

The first hand seal member 370 seals between the second link 60 and the protruding shaft 352 so as to seal the wiring space S10 in the conveyance space S01. For example, the first hand seal member 370 seals between the second link 60 and the protruding shaft 352 so as to make an airtight separation between the wiring space S10 and the conveyance space S01. The first hand seal member 370 may be attached to the second link 60 in a detachable state separately from the main body 340. The first hand seal member 370 may wear due to friction with the protruding shaft 352, but the worn first hand seal member 370 may readily be detached and replaced separately from the main body 340. Accordingly, both prevention of gas generation in the chamber 90 and maintainability may be achieved. Attaching the first hand seal member 370 to the second link 60 may not be limited to attaching the first hand seal member 370 directly to the second link 60. For example, attaching the first hand seal member 370 to the second link 60 may include attaching the first hand seal member 370 to a separate member secured to the second link 60. For example, the first hand seal member 370 is attached to the motor housing 341 from above.

For example, the first hand seal member 370 includes an inner seal 371 and a seal cover 372. The inner seal 371 seals between the second link 60 and the protruding shaft 352. Sealing between the second link 60 and the protruding shaft 352 by the inner seal 371 may not be limited to bringing the inner seal 371 into airtight contact with both the second link 60 and the protruding shaft 352. For example, sealing between the second link 60 and the protruding shaft 352 may include bringing the inner seal 371 into airtight contact with a separate member that is hermetically connected to the second link 60 and to the protruding shaft 352.

For example, the inner seal 371 is a mechanical seal, the fixed ring of the inner seal 371 is in airtight contact with the inner peripheral surface of the motor housing 341 hermetically connected to the second link 60, and the rotating ring of the inner seal 371 is in airtight contact with the outer peripheral surface of the protruding shaft 352. The seal cover 372 covers the inner seal 371 from above around the protruding shaft 352 and is attached to the motor housing 341 by bolt fastening or the like.

The second hand seal member 380 seals between the protruding shaft 352 and the protruding shaft 322 so as to seal the wiring space S10 in the conveyance space S01. The second hand seal member 380 may be attached to the protruding shaft 352 in a detachable state separately from the main body 310 and the main body 340. Both of reliability of sealing and maintainability of the second hand seal member 380 may be achieved.

For example, the second hand seal member 380 may include a second cover 381, a second outer seal 386, and a second inner seal 387. The second cover 381 surrounds the protruding shaft 322 and is attached to the protruding shaft 352. The second outer seal 386 seals between the second cover 381 and the protruding shaft 352. The second inner seal 387 seals between the second cover 381 and the protruding shaft 322 while allowing rotation of the protruding shaft 322 relative to the second cover 381. Both reliability of sealing and maintainability of the second hand seal member 380 may further be achieved.

The second cover 381 may hold the hand 20. By using the second cover 381 as a holding member of the hand, the number of components may be reduced.

For example, the second cover 381 includes a fitting portion 382, a flange 383, and a fitting portion 384. The fitting portion 382 fits into the protruding shaft 352 from above. The flange 383 extends outward from the outer peripheral surface of the fitting portion 382 over the entire circumference above the fitting portion 382. The fitting portion 384 projects further upward from the flange 383 with a smaller outer radius than the flange 383.

The flange 383 is attached to the protruding shaft 352 by bolt fastening or the like inside the outer periphery of the fitting portion 384. The hand 20 has an opening 21 corresponding to the fitting portion 384. The fitting portion 384 fits into the opening 21 from below. The flange 383 is attached to the hand 20 by bolt fastening or the like outside the outer periphery of the fitting portion 384.

The second outer seal 386 seals between the fitting portion 382 and the protruding shaft 352. The second outer seal 386 is an O-ring, for example, and is disposed between the outer peripheral surface of the fitting portion 382 and the inner peripheral surface of the protruding shaft 352 over the entire circumference.

The second inner seal 387 is, for example, a mechanical seal, and a fixed ring of the second inner seal 387 is held in airtight contact with an inner peripheral surface of the second cover 381, and a rotating ring of the second inner seal 387 is held in airtight contact with an outer peripheral surface of the protruding shaft 322.

As described above, with the combination of the first hand seal member 370 that seals between the second link 60 and the protruding shaft 352 and the second hand seal member 380 that seals between the protruding shaft 352 and the protruding shaft 322, both downsizing of the drive system of the hand 20 and the second hand 70 and sealing of the wiring space S10 may be achieved.

Modification

Figure 8:
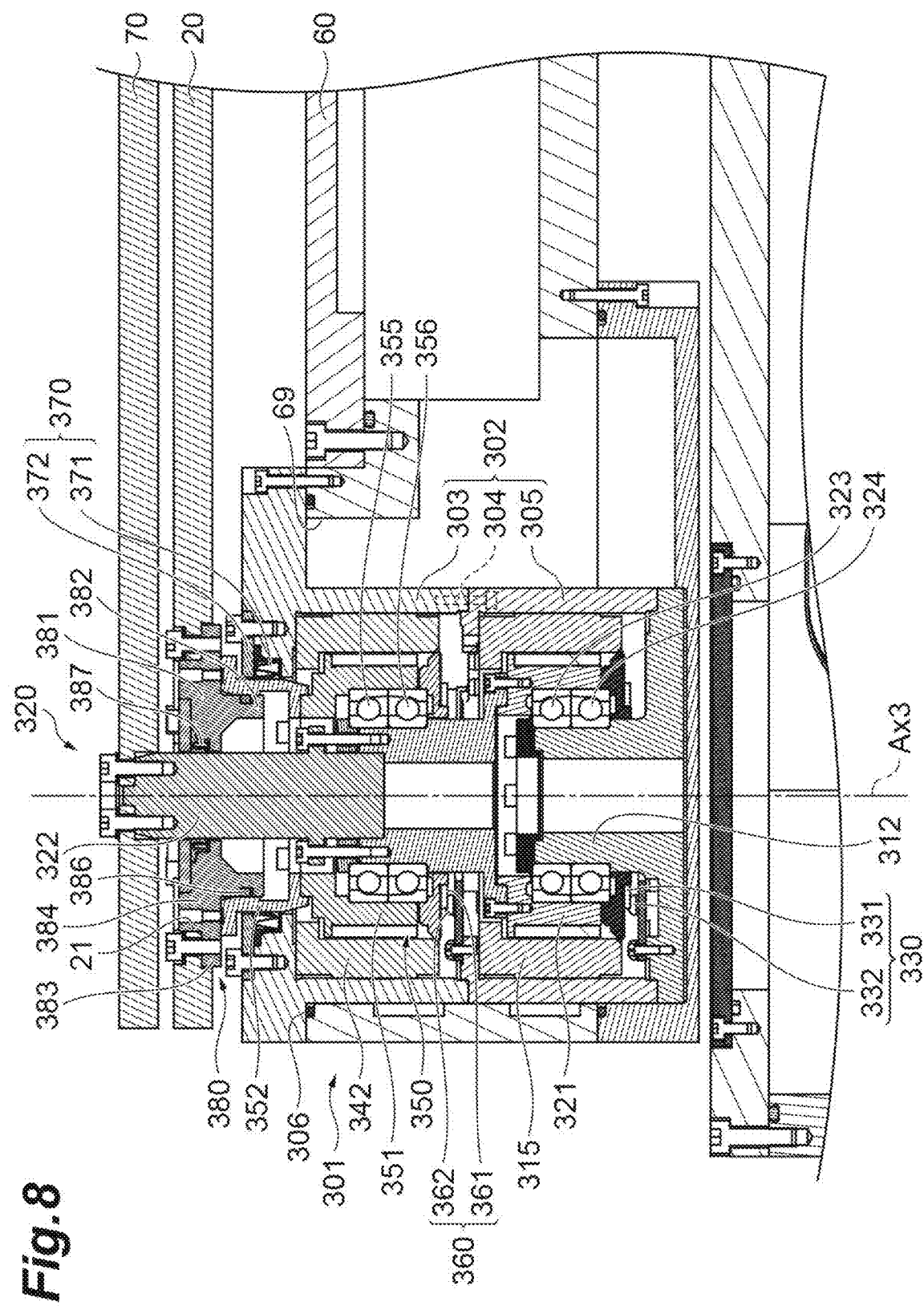
FIG. 8 is a diagram illustrating a modified example of a hand motor.

Although FIG. 7 illustrates an example in which the motor housing 341 of the main body 340 is attached to the second link 60 together with the stator 342 from above and the motor housing 311 of the main body 310 is attached to the second link 60 together with the stator 315 from below, the main body 310 and the main body 340 may be integrated and attached to the second link 60 from the same side. For example, the hand motor 301 illustrated in FIG. 8 includes a motor housing 302 and a motor seal 306 instead of motor housings 341, 311 and the motor seal 343.

The motor housing 302 houses and unitizes stators 342, 315, output shafts 350, 320, and the fixed shaft 312. The motor housing 302 is attached to the second link 60 from where the hand 20 and the second hand 70 are located. For example, the second link 60 (arm link) include a first portion 60a and a second portion 60b. The first portion 60a is located between the second portion 60b and both the first hand 20 and the second hand 70. Since the drive system of the hand 20 and the drive system of the second hand 70 may be integrated and assembled to the second link 60 by the motor housing 302, the assemblability is improved.

The motor seal 306 seals between the motor housing 302 and the second link 60. For example, the motor seal 306 is an O-ring, is disposed between the second link 60 and the motor housing 302 so as to surround the opening 69, and is in airtight contact with the second link 60 and the motor housing 302 over the entire circumference.

The motor housing 302 may include a first housing 303, a second housing 305, and a plurality of fastening members 304. The first housing 303 contains the stator 342. The second housing 305 contains the stator 315. The plurality of fastening members 304 are, for example, bolts, and fasten the second housing 305 to the first housing 303. The first housing 303 may be attached to the first portion 60a. Since the second housing 305 may be attached to the first housing 303 after the assembly of the stator 342 and the like to the first housing 303 and the assembly of the stator 315 and the like to the second housing 305 are individually performed, the assemblability is further improved.

Figure 9:
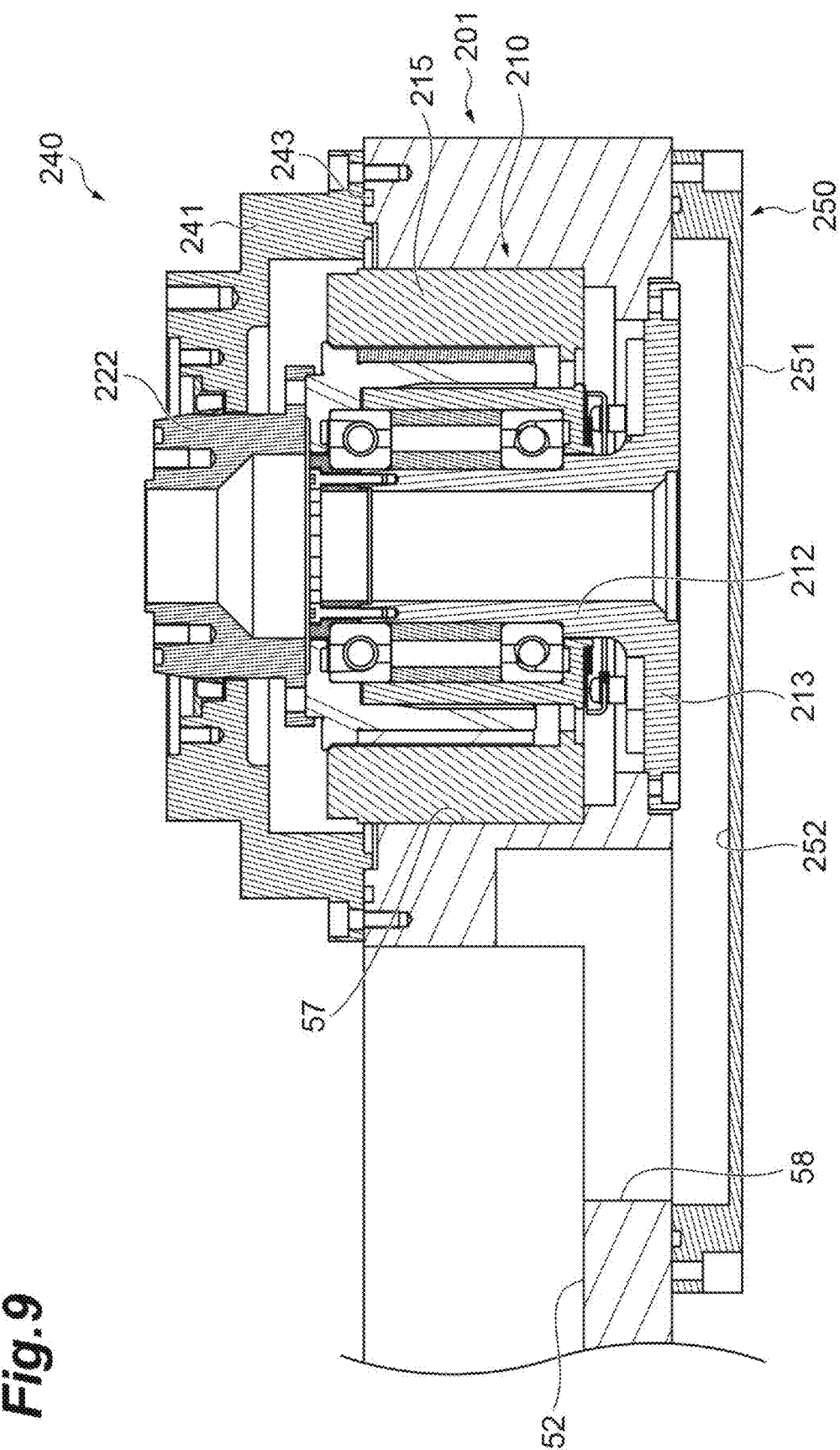
FIG. 9 is a diagram illustrating a modified example of a second arm motor.

In at least one of the plurality of actuators 40 that are direct drive motors, the stator may be directly embedded in the base-side link or the hand-side link. FIG. 9 illustrates a configuration in which the stator 215 is directly embedded in the first link 50 in the arm motor 201.

Instead of the opening 54, an accommodation hole 57 that opens upward and downward is formed in the first link 50. An opening 58 for communicating the internal space 52 downward is formed next to the accommodation hole 57.

The stator 215 is accommodated in the accommodation hole 57 from above and is fixed to the inner peripheral surface of the accommodation hole 57 by shrink fitting or the like, for example. The fixed shaft 212 is attached to the first link 50 so as to be detachable toward a direction away from the second link 60. For example, the flange 213 of the fixed shaft 212 is attached to the first link 50 by bolt fastening or the like around the accommodation hole 57.

The cover 241 of the base-side seal member 240 is attached to the motor housing 211 by bolt fastening or the like around the accommodation hole 57. The outer seal 243 is in airtight contact with the first link 50 and the cover 241 all around the accommodation hole 57.

The back seal member 250 seals the accommodation hole 57 and the opening 58 around the entire circumference. With the back seal member 250 attached to the first link 50, the recess 252 of the back cover 251 places the protruding shaft 222 in communication with the internal space 52.

If the stator is directly embedded in the link, it is difficult to replace the motor itself. For this reason, it is further beneficial to be able to detach and replace the base-side seal member 240 separately from the main body 210.

In FIG. 9, the fixed shaft 212 is attached to the first link 50 in a detachable state. By stabilizing the posture of the protruding shaft 222 by the fixed shaft 212, the reliability of the sealing by the base-side seal member 240 may be improved. Further, since the fixed shaft 212 is detachable, the maintainability of the arm motor 201 is improved.

The fixed shaft 212 is attached to the first link 50 from the opposite side where the second link 60 is located, and the back seal member 250 is attached to the first link 50 to seal between the fixed shaft 212 and the protruding shaft 222 within the first link 50. Both workability of attaching and detaching the fixed shaft 212 and sealing performance between the fixed shaft 212 and the protruding shaft 222 may be achieved.

Figure 10:
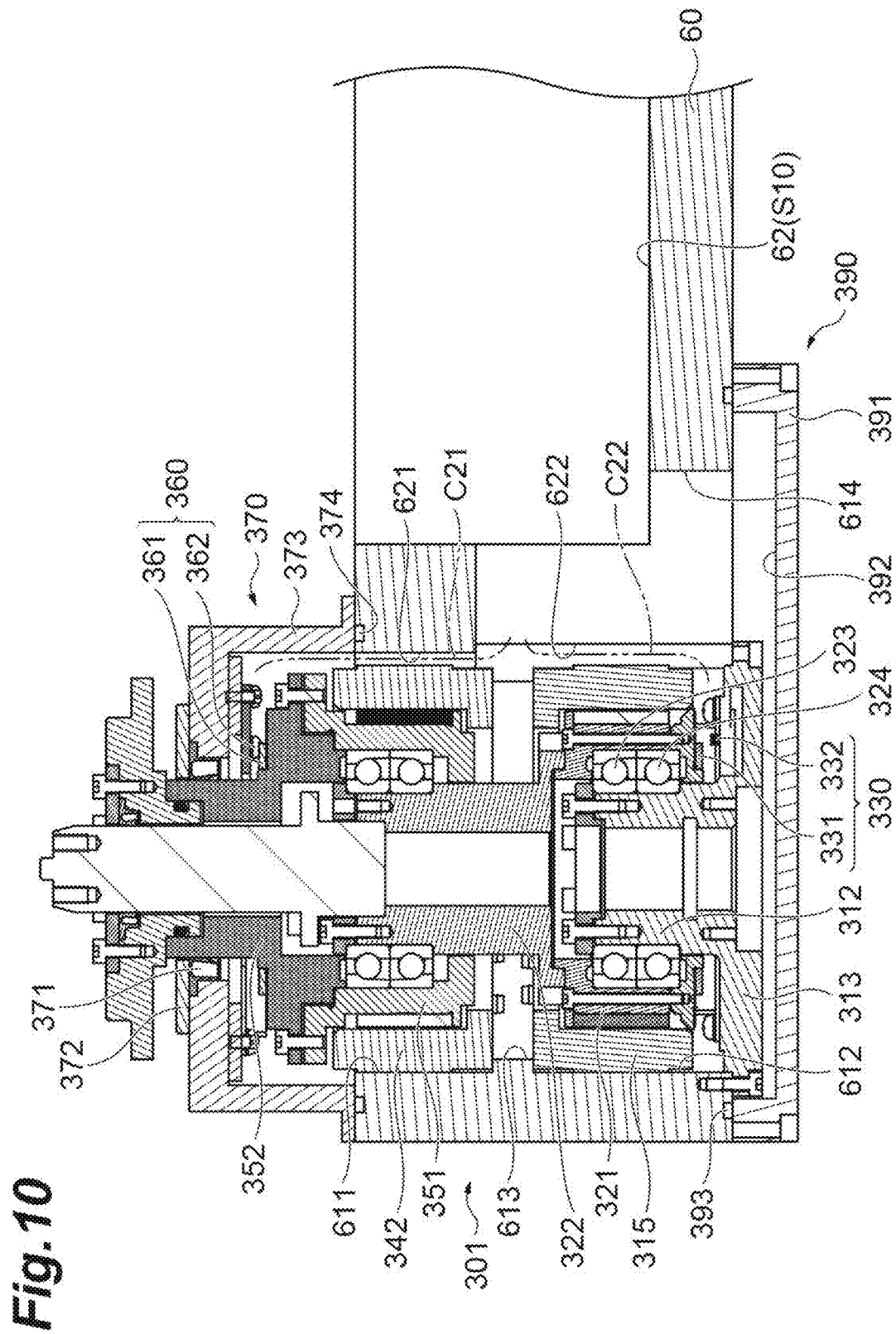
FIG. 10 is a diagram illustrating another modified example of a hand motor.

FIG. 10 illustrates a configuration in which the stator 315 and the stator 342 are embedded directly in the second link 60 in the hand motor 301. The second link 60 has a first accommodation hole 611 and a second accommodation hole 612 instead of the opening 68 and the opening 69. The first accommodation hole 611 is open on the side where the hand 20 and the second hand 70 are located (upper side) and receives the stator 342. For example, the first accommodation hole 611 opens toward both the hand 20 and the second hand 70. The second accommodation hole 612 opens opposite to where the hand 20 and the second hand 70 are located (lower side) and receives the stator 315. For example, second accommodation hole 612 opens toward a direction away from the hand 20 and the second hand 70. The second link 60 may further include an inward flange 613 that partitions between the first accommodation hole 611 and the second accommodation hole 612 and surrounds the protruding shaft 322.

Next to the second accommodation hole 612, an opening 614 is formed that communicates the internal space 62 downward. The opening 614 and the second accommodation hole 612 may be connected.

The stator 342 is accommodated in the first accommodation hole 611 from above and is directly fixed to the inner surface of the first accommodation hole 611 by, for example, shrink fitting. The stator 315 is housed in the second accommodation hole 612 from below and is directly fixed to the inner surface of the second accommodation hole 612, for example by shrink fitting. By omitting the motor housing 311 and the motor housing 341, the size of the vicinity of the hand motor 301 may further be reduced.

The flange 313 of the fixed shaft 312 is attached to the second link 60 by bolt fastening or the like around the second accommodation hole 612. For example, the flange 313 may be attached to the second portion 60b of the second link 60 from a direction away from both the first hand 20 and the second hand 70.

The first hand seal member 370 further includes a cover 373 and an outer seal 374. The cover 373 is attached to the second link 60 from the outside. The cover 373 surrounds the protruding shaft 322, extends outward from the inner circumference of the first accommodation hole 611 over the entire circumference, and is attached to the second link 60 from above by bolt fastening or the like.

The outer seal 374 seals between the cover 373 and the second link 60. For example, the outer seal 374 is an O-ring, is disposed between the cover 373 and the second link 60 so as to surround the protruding shaft 352, and is in airtight contact with the cover 373 and the second link 60 over the entire circumference. The inner seal 371 seals between the cover 373 and the protruding shaft 352 while allowing rotation of the protruding shaft 352 relative to the cover 373. The seal cover 372 is attached to the cover 373 by bolt fastening or the like.

The articulated arm 3 may further include a back seal member 390 covering the second accommodation hole 612 and the opening 614. Drive system of the hand 20 and the second hand 70 without motor housings 311, 341 may readily be sealed by the back seal member 390. By detaching the back seal member 390, attachment and detachment of the fixed shaft 312, wiring to stators 315, 342, wiring to the rotation sensors 330, 360, and the like may readily be performed.

The back seal member 390 includes a back cover 391 and a cover seal 393. The back cover 391 extends to the outside of the inner peripheries of the second accommodation hole 612 and the opening 614 over the entire periphery, covers the second accommodation hole 612 and the opening 614 from below, and is attached to the second link 60 by bolt fastening or the like. The cover seal 393 seals between the back cover 391 and the second link 60. The cover seal 393 is, for example, an O-ring, is disposed between the second link 60 and the back cover 391 around the second accommodation hole 612 and the opening 614, and is in airtight contact with the second link 60 and the back cover 391 over the entire circumference.

The back cover 391 may have a recess 392 directed into the second link 60. The recess 392 places a bearing 323 in communication with the internal space 62 of the second link 60. Since the back cover 391 also constitutes a part of the wiring space S10, further space saving of the arm 4 may be achieved.

The stator 342 (first stator) and the stator 315 (second stator) may be disposed between the rotation sensor 360 (first rotation sensor) and the rotation sensor 330 (second rotation sensor). For example, the rotation sensor 330 is provided below the stator 315 and the rotation sensor 360 is provided above the stator 342. The rotation sensor 360 and the rotation sensor 330 may readily be assembled in a state where the stator 342 is fixed to the inner surface of the first accommodation hole 611 and the stator 315 is fixed to the inner surface of the second accommodation hole 612. Accordingly, the assemblability may be improved.

For example, the disk 361 of the rotation sensor 360 is mounted in the protruding shaft 352 above the rotor 351 and is located in the cover 373. The sensor head 362 is attached to the cover 373. The disk 331 of the rotation sensor 330 is mounted below the rotor 321. The sensor head 332 is attached to the flange 313. The assemblability may be further improved.

The inner surface of the first accommodation hole 611 may be formed with a first recess 621 that is partially spaced apart from the stator 342 and the inner surface of the second accommodation hole 612 may be formed with a second recess 622 that is partially spaced apart from the stator 315. The rotation sensor 360 may have a first sensor cable C21 wired through the first recess 621. The rotation sensor 330 may have a second sensor cable C22 wired through the second recess 622. Wiring paths of the first sensor cable C21 and the second sensor cable C22 may be secured while preventing enlargement of the second link 60.

Figure 11:
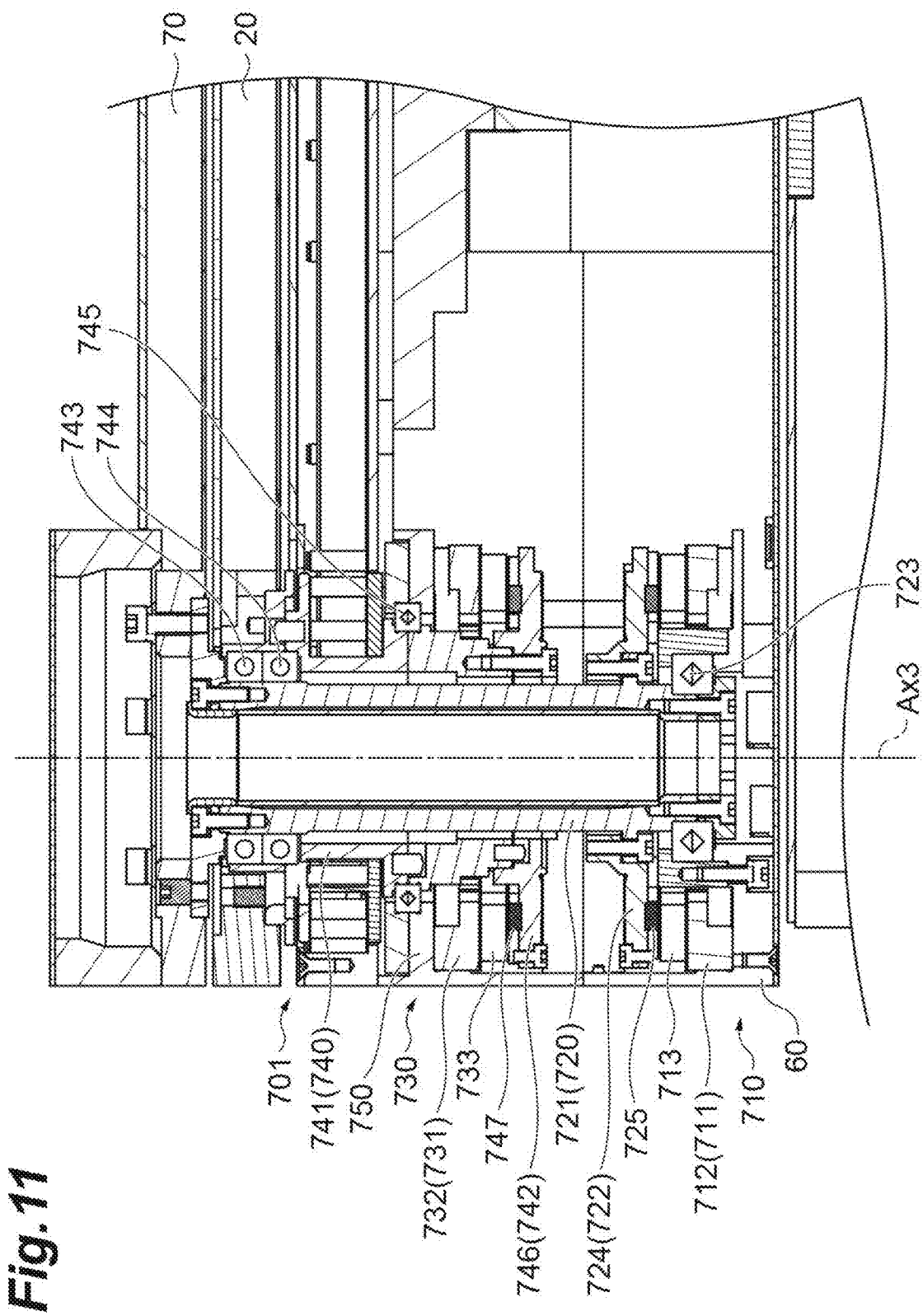
FIG. 11 is a diagram illustrating still another modified example of a hand motor.

As illustrated in FIG. 11, the robot 2 may include an axial gap-type hand motor 701 instead of the radial gap-type hand motor 301. Both positioning accuracy and miniaturization may be achieved by adopting radial gap type motors for the arm motor 101 and the arm motor 201 on which a large moment acts as compared with a moment on the hand motor 701 and adopting an axial gap motor for the hand motor 701 on which a large moment does not act as compared with moments on the arm motor 101 and the arm motor 201.

The hand motor 701 includes an output shaft 740 (first output shaft), a stator 731 (first stator) that rotates the hand 20 around the third axis Ax3 (hand axis) by applying a rotating magnetic field to the output shaft 740, an output shaft 720 (second output shaft) extending through the output shaft 740 along the third axis Ax3, and a stator 711 (second stator) that rotates the second hand 70 around the third axis Ax3 by applying a rotating magnetic field to the output shaft 720.

The output shaft 740 includes a rotor 742 (first rotor) that faces the stator 731 along the third axis Ax3 (axial direction) and receives the rotating magnetic field from the stator 731, and the output shaft 720 includes a rotor 722 (second rotor) that faces the stator 711 along the third axis Ax3 (axial direction) and receives the rotating magnetic field from the stator 711. A height of a drive system for a plurality of stages of the hand 20 and the second hand 70 may be reduced.

The stator 731 and the stator 711 may be fixed to a base-side link (the second link 60), the output shaft 740 may be fixed to the hand 20, the output shaft 720 may be fixed to the second hand 70 through the output shaft 740 and the hand 20, and the stator 731 may be located between the hand 20 and the stator 711.

The hand motor 701 may include a first bearing held by the second link 60 and holding the output shaft 720 or the output shaft 740 so as to rotate around the third axis Ax3 and a second bearing held by the output shaft 720 between the outer circumference of the output shaft 720 and the inner circumference of the output shaft 740 and holding the output shaft 740 to rotate around the third axis Ax3.

For example, the hand motor 701 includes a bearing 723 (first bearing) held by the second link 60 and holding the output shaft 720 so as to rotate around the third axis Ax3, and bearings 743, 744 (second bearing) held by the output shaft 720 and holding the output shaft 740 so as to rotate around the third axis Ax3.

By utilizing the space between the output shaft 740 and the output shaft 720 as a space for placing bearings, and by letting the output shaft 740 and the output shaft 720 to hold each other, both miniaturization and rigidity of the drive system of a plurality of stages of the hand 20 and the second hand 70 may be achieved.

The hand motor 701 may further include a bearing 745 held by the second link 60 and holding the output shaft 740 so as to rotate around the third axis Ax3. The rigidity may further be increased.

In an orientation along the third axis Ax3, the stator 731 may be located between the stator 711 and the hand 20, the rotor 742 and the rotor 722 may be located between the bearing 723 and the bearing 745, and the bearing 745 may be located between the bearing 723 and the bearings 743, 744. Both miniaturization and rigidity may further be achieved.

The articulated arm 3 may further include a frame 750 located between the second link 60 and both the hand 20 and the second hand 70, and attached to the second link 60 in a detachable state, the stator 731 may be secured to the second link 60 via the frame 750, and the stator 711 may be secured directly to the second link 60. Both miniaturization and assemblability may further be achieved.

The bearing 723 and the bearing 745 may be cross-roller bearings and the bearings 743, 744 may be radial bearings. Both miniaturization and rigidity may further be achieved.

As an example, the hand motor 701 includes a main body 710, the output shaft 720, the bearing 723, a main body 730, the output shaft 740, the bearings 743, 744, and the bearing 745. The main body 710 includes the stator 711. The stator 711 includes a yoke 712 and a plurality of coils 713. The yoke 712 has a disk shape with an opening at the center, and is directly fixed to the second link 60 by, for example, shrink fitting or the like so as to surround the third axis Ax3. The plurality of coils 713 are arranged to surround the third axis Ax3 and are fixed over the yoke 712.

The output shaft 720 includes a main shaft 721 and the rotor 722. The main shaft 721 protrudes upward along the third axis Ax3 and is fixed to the second hand 70 through the frame 750 and the hand 20. The rotor 722 includes a core 724 and a plurality of permanent magnets 725. The core 724 extends in a flange shape from the main shaft 721 over the entire circumference of the stator 711. The plurality of permanent magnets 725 are arranged to surround the third axis Ax3 and are fixed under the core 724. The plurality of permanent magnets 725 face the plurality of coils 713 from above.

The bearing 723 is held on the second link 60 and holds the main shaft 721 so as to rotate around the third axis Ax3. The bearing 723 is, for example, a cross roller bearing. The cross roller bearing incorporates a roller that receives a radial load perpendicular to the third axis Ax3 and a roller that receives an axial load along the third axis Ax3. The bearing 723 may be positioned at a height that is surrounded by the rotor 722.

The main body 730 includes the stator 731. The stator 731 includes a yoke 732 and a plurality of a coil 733. The yoke 732 has a disk shape with an opening at the center and is fixed to the second link 60 by, for example, shrink fitting or the like so as to surround the third axis Ax3. The plurality of coils 733 are arranged to surround the third axis Ax3 and are fixed under the yoke 732. The stator 731 is located above the stator 711 and the rotor 722 and surrounds the main shaft 721.

The output shaft 740 includes a main shaft 741 and the rotor 742. The main shaft 741 surrounds the main shaft 721 above the rotor 742. The rotor 742 has a core 746 and a plurality of a permanent magnet 747. The core 746 extends in a flange shape from the main shaft 741 over the entire circumference between the stator 731 and the rotor 722. The plurality of permanent magnets 747 are arranged so as to surround the third axis Ax3 and are fixed over the core 746. The plurality of permanent magnets 747 face the plurality of coils 733 from below.

The bearings 743, 744 are, for example, ball type radial bearings, and vertically arranged between the inner peripheral surface of the main shaft 741 and the outer peripheral surface of the main shaft 721. Each of the bearings 743, 744 is held by the main shaft 721 and holds the main shaft 741 so as to rotate around the third axis Ax3.

The bearing 745 is held by the frame 750 and holds the main shaft 741 so as to rotate around the third axis Ax3. Being held by the frame 750 is included in being held by the second link 60. The bearing 745 is, for example, a cross roller bearing.

The rotor 742 and the rotor 722 are located between the bearing 723 and the bearing 745, and the bearing 745 may be located between the bearing 723 and the bearings 743, 744. Both miniaturization and rigidity may further be achieved.

With reference to FIG. 11, a configuration in which the third bearing is provided in addition to the first bearing and the second bearing in the axial gap-type the hand motor 701 is illustrated. In the hand motor 301 of the radial gap type, a third bearing may be provided which is held by the second link 60 and holds the main shaft 741 so as to rotate around the third axis Ax3.

Figure 12:
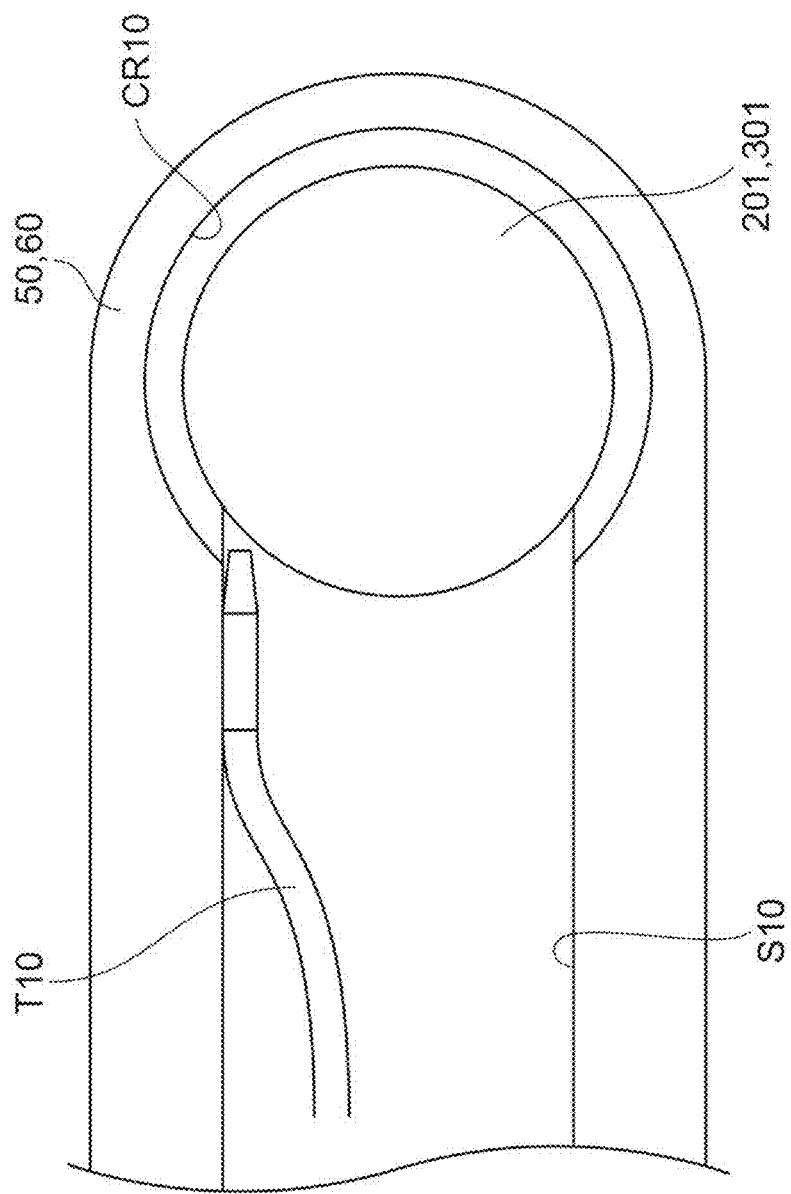
FIG. 12 is a diagram illustrating an example tube and an air cooling flow path.

As illustrated in FIG. 12, the articulated arm 3 may further include a tube T10 and an air cooling flow path CR10 corresponding to a motor located inside the chamber 90 (for example, at least one of the arm motor 201 and the hand motor 301). The tube T10 is piped inside the wiring space S10 and introduces air cooling gas from the outside of the chamber 90. The air cooling flow path CR10 receives the gas introduced by the tube T10 and delivers the gas to the interior of the wiring space S10 via the periphery of the motor. For example, the air cooling flow path CR10 for the arm motor 201 is formed in the first link 50, and the air cooling flow path CR10 for the hand motor 301 is formed in the second link 60. By utilizing the wiring space S10 as an exhaust path of air cooling gas, the motor may be cooled with a small number of the tubes T10.

Figure 13:
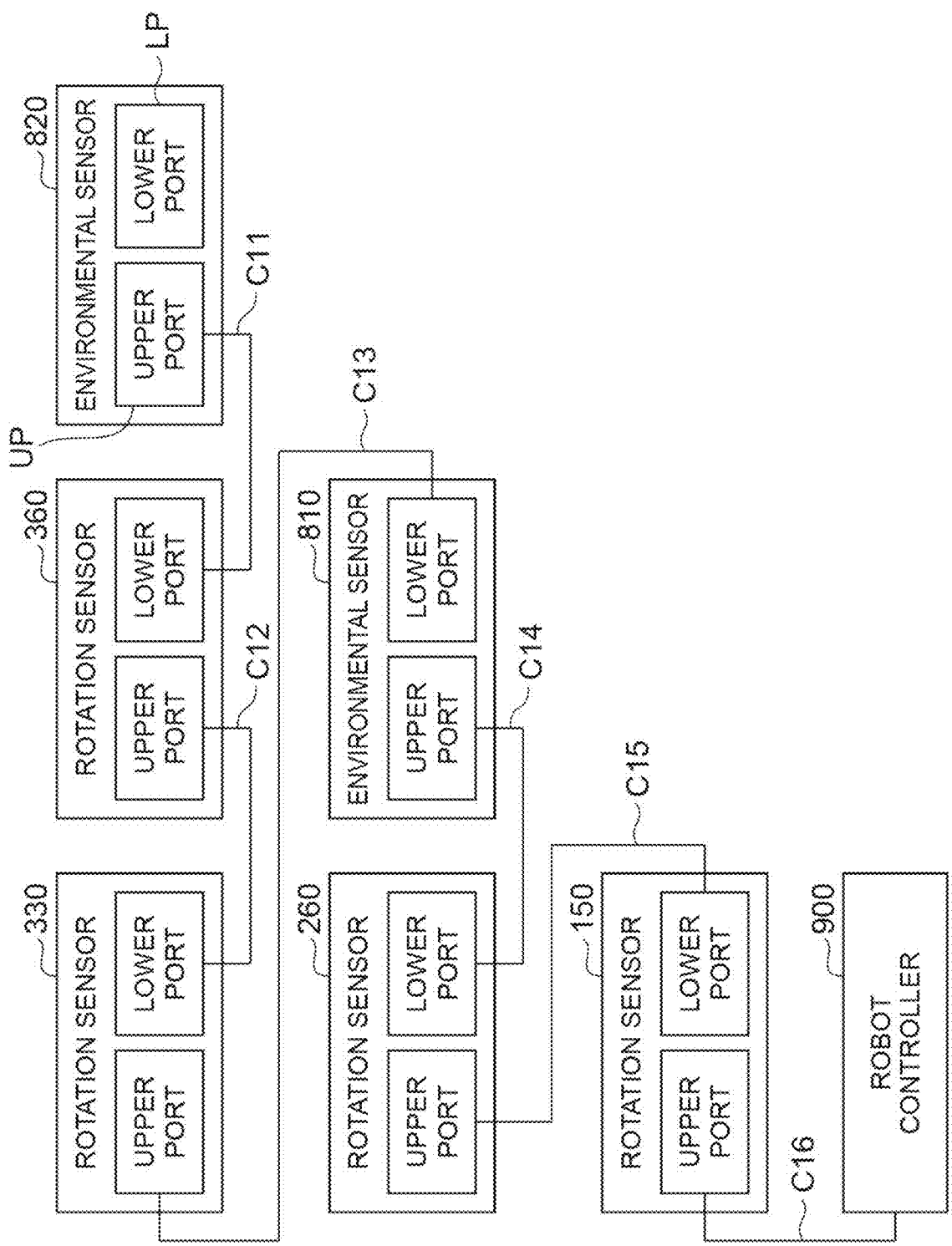
FIG. 13 is a diagram illustrating an example wiring of a cable.

As illustrated in FIG. 13, the robot 2 may further include environmental sensors 810, 820 that detect the environment within the wiring space S10. The environmental sensor 810 detects the environment of the internal space 52. The environmental sensor 820 detects the environment of the internal space 62. Examples of the environmental sensors 810, 820 include temperature sensors, moisture sensors, and the like.

Each of the plurality of sensors including rotation sensors 150, 260, 330, 360 and the environmental sensors 810, 820 may include an upper port UP and a lower port LP and be configured to transmit from the upper port UP the results of detection by the sensors themselves and information received at the lower port LP. With this configuration, the rotation sensors 150, 260, 330, 360 and the environmental sensors 810, 820 may be daisy-chained by a series of the cable C10 and connected to a robot controller 900 or the like located outside the chamber 90.

For example, the cable C10 includes a cable C11, a cable C12, a cable C13, a cable C14, a cable C15, and a cable C16. The cable C11 connects the upper port UP of the environmental sensor 820 to the lower port LP in the rotation sensor 360. The cable C12 connects the upper port UP of the rotation sensor 360 to the lower port LP in the rotation sensor 330. The cable C13 connects the upper port UP of the rotation sensor 330 to the lower port LP in the environmental sensor 810. The cable C14 connects the upper port UP of the environmental sensor 810 to the lower port LP in the rotation sensor 260. The cable C15 connects the upper port UP of the rotation sensor 260 to the lower port LP in the rotation sensor 150. The cable C16 connects the upper port UP of the rotation sensor 150 to the robot controller 900. The above connection order is merely an example, and may be modified in any way.

The environmental sensor 820 transmits the detection result of the environment of the internal space 62 from the upper port UP. The rotation sensor 360 receives the detection result of the environment from the environmental sensor 820 at the lower port LP via the cable C11, and transmits the detection result of the rotation of the output shaft 350 and the information received at the lower port LP from the upper port UP. The rotation sensor 330 receives the information transmitted from the rotation sensor 360 at the lower port LP via the cable C12, and transmits the detection result of the rotation of the output shaft 320 and the information received at the lower port LP from the upper port UP. The environmental sensor 810 receives the information transmitted from the rotation sensor 330 at the lower port LP via the cable C13, and transmits the detection result of the environment of the internal space 52 and the information received at the lower port LP from the upper port UP. The rotation sensor 260 receives the information transmitted from the environmental sensor 810 at the lower port LP via the cable C14, and transmits the detection result of the rotation of the output shaft 220 and the information received at the lower port LP from the upper port UP. The rotation sensor 150 receives the information transmitted from the rotation sensor 260 at the lower port LP via the cable C15, and transmits the detection result of the rotation of the output shaft 120 and the information received at the lower port LP from the upper port UP. The robot controller 900 receives the transmitted information from the rotation sensor 150 via the cable C16.

In the above configuration, the environmental sensor 820 is connected to the rotation sensor 360 via the cable C11 (sensor cable), and the rotation sensor 360 receives the detection result of the environment via the cable C11, and transmits both the detection result of the rotation and the detection result of the environment to the outside of the chamber 90 via the cables C12, C13, C14, C15, C16. The environmental sensor 810 is connected to the rotation sensor 260 via the cable C14 (sensor cable), and the rotation sensor 260 receives the detection result of the environment via the cable C14 and transmits both the detection result of the rotation and the detection result of the environment to the outside of the chamber 90 via the cables C15, C16. The number of cables may be reduced, and generation of gas from the cables may further be prevented.

The above disclosure includes the following configurations.

(1) The robot 2 comprising: the articulated arm 3 comprising: the first hand 20 and the second hand 70 each capable of supporting the electronic substrate W; the hand joint J13 configured to rotate the first hand 20 and the second hand 70 around the hand axis Ax3 that is vertical; the base 10; the arm 4 connecting the first hand 20 and the second hand 70 to the base 10; and a plurality of arm joints J10 arranged along the arm 4, each of the plurality of arm joints J10 being configured to move around an arm axis that is vertical so as to change a position of the hand axis Ax3 relative to the base 10, wherein the hand joint J13 comprises a hand motor 301 configured to rotate the first hand 20 and the second hand 70 independently of each other, and wherein the hand motor 301 comprises: the first output shaft 350 fixed to the first hand 20; the first stator 342 configured to apply a rotating magnetic field around the hand axis Ax3 on the first output shaft 350 in a link of the articulated arm 3 connected to the first hand 20 and the second hand 70 at the hand joint J13; the second output shaft 320 extending through the first output shaft 350 and fixed to the second hand 70; the second stator 315 configured to apply a rotating magnetic field around the hand axis Ax3 on the second output shaft 320 in the link; the first bearing 323, 324 held by the link and holding the first output shaft 350 or the second output shaft 320 so as to rotate around the hand axis Ax3; and the second bearing 355, 356 held by the second output shaft 320 between an outer periphery of the second output shaft 320 and an inner periphery of the first output shaft 350, the second bearing 355, 356 holding the first output shaft 350 so as to rotate around the hand axis Ax3.

By utilizing the space between the first output shaft 350 and the second output shaft 320 as a bearing arrangement space, and causing the first output shaft 350 and the second output shaft 320 to hold each other, both miniaturization and rigidity of the drive system of the hand in a plurality of stages may be achieved.

(2) The robot 2 according to (1), wherein the first bearing 323, 324 holds the second output shaft 320, and wherein the hand motor 301 further comprises a third bearing 745 held by the link and holding the first output shaft 350 so as to rotate around the hand axis Ax3.

The rigidity may be further increased.

(3) The robot 2 according to (1), wherein the hand motor 301 further comprises a fixed shaft 312 fixed to the link and inserted into the second output shaft 320 along the hand axis Ax3, wherein the first bearing 323, 324 is held by the fixed shaft 312 between the outer periphery of the fixed shaft 312 and the inner periphery of the second output shaft 320 and holding the second output shaft 320, wherein the first output shaft 350 comprises the first rotor 351 facing the first stator 342 in a radial direction perpendicular to the hand axis Ax3 and receiving the rotating magnetic field from the first stator 342, and wherein the second output shaft 320 comprises the second rotor 321 facing the second stator 315 in a radial direction and receiving the rotating magnetic field from the second stator 315.

(4) The robot 2 according to (3), wherein the hand motor 301 comprises the motor housing 302 that houses and unitizes the first stator 342, the second stator 315, the first output shaft 350, the second output shaft 320, and the fixed shaft 312, and the motor housing 302 is attached to the link 60 from a side where the first hand 20 and the second hand 70 are disposed.

Since the drive system of the first hand 20 and the drive system of the second hand 70 may be integrated and assembled in the second link 60 by the motor housing 302, assemblability is improved.

(5) The robot 2 according to (4), wherein the motor housing 302 comprises: the first housing 303 that houses the first stator 342; the second housing 305 that houses the second stator 315; and the fastening member 304 attaching the second housing 305 to the first housing 303, and the first housing 303 is attached to the link 60.

Since the second housing 305 may be attached to the first housing 303 after the assembly of the first stator 342 or the like to the first housing 303 and the assembly of the second stator 315 or the like to the second housing 305 are individually performed, the assemblability is further improved.

(6) The robot 2 according to (3), wherein the first stator 342 is attached to the link from a side where the first hand 20 and the second hand 70 are disposed, and wherein the second stator 315 is attached to the link from a side opposite to the side where the first hand 20 and the second hand 70 are disposed.

The assemblability may be improved.

(7) The robot 2 according to (6), wherein the link comprises: the first accommodation hole 611 opening on a side where the first hand 20 and the second hand 70 are disposed and receiving the stator 342; the second accommodation hole 612 opening on a side opposite to the side where the first hand 20 and the second hand 70 are disposed, and receiving the second stator 315; and an inward flange 613 partitioning between the first accommodation hole 611 and the second accommodation hole 612 and surrounding the second output shaft 320.

The assemblability may be further improved.

(8) The robot 2 according to (7), wherein the first stator 342 is directly fixed to an inner surface of the first accommodation hole 611, and the second stator 315 is directly fixed to an inner surface of the second accommodation hole 612.

Further miniaturization may be achieved.

(9) The robot 2 according to (8), wherein the hand motor 301 further comprises: the first rotation sensor 360 configured to detect rotation of the first output shaft 350; and the second rotation sensor 330 configured to detect rotation of the second output shaft 320, wherein the first stator 342 and the second stator 315 are disposed between the first rotation sensor 360 and the second rotation sensor 330.

The first rotation sensor 360 and the second rotation sensor 330 may readily be assembled in a state where the first stator 342 is fixed to the inner surface of the first accommodation hole 611 and the second stator 315 is fixed to the inner surface of the second accommodation hole 612. Therefore, the assemblability may be improved.

(10) The robot 2 according to (9), wherein the articulated arm 3 further comprises the cover 373 surrounding the first output shaft 350 and attached to the link between the first hand 20 and the link, wherein the first rotation sensor 360 comprises; a first disk configured to rotate together with the first output shaft 350 within the cover 373; and a first sensor head attached to the cover 373 and configured to detect rotation of the first disk, wherein the fixed shaft 312 comprises: a flange 313 attached to the link from a side opposite to a side where the first hand 20 and the second hand 70 are located, and the second rotation sensor 330 comprises: a second disk configured to rotate together with the second output shaft 320 between the flange 313 and the second stator 315; and a second sensor head attached to the flange 313 and configured to detect rotation of the second disk.

The assemblability may be further improved.

(11) The robot 2 according to (9) or (10), wherein an inner surface of the first accommodation hole 611 is formed with the first recess 621 that is partially spaced apart from the first stator 342, wherein an inner surface of the second accommodation hole 612 is formed with the second recess 622 that is partially spaced apart from the second stator 315, wherein the first sensor cable C21 is wired to the first rotation sensor 360 via the first recess 621, and the second sensor cable C22 is wired to the second rotation sensor 330 via the second recess 622.

Wiring paths for the first sensor cable C21 and the second sensor cable C22 may be secured while preventing enlargement of a link.

(12) The robot 2 according to any one of (1) to (11), wherein the first output shaft 740 comprises the first rotor 742 facing the first stator 731 along the hand axis Ax3 and receiving a rotating magnetic field from the first stator 731, and wherein the second output shaft 720 comprises the second rotor 722 facing the second stator 711 along the hand axis Ax3 and receiving a rotating magnetic field from the second stator 711.

The size of the drive system of the hand having a plurality of stages may be further reduced.

(13) The robot 2 according to (12), wherein the first bearing 723 holds the second output shaft 320, and wherein the hand motor 701 further comprises the third bearing 745 held by the link and holding the first output shaft 740 so as to rotate around the hand axis Ax3.

The rigidity may be further increased.

(14) The robot 2 according to (13), wherein the first bearing 723 and the third bearing 745 are cross roller bearings, and wherein the second bearing 743, 744 is a radial bearing.

Both miniaturization and rigidity may be further achieved.

(15) The robot 2 according to (13) or (14), wherein in an orientation along the hand axis Ax3, the first stator 731 is located between the second stator 711 and the first hand 20 and the second hand 70, the first rotor 742 and the second rotor 722 are located between the first bearing 723 and the third bearing 745, and the third bearing 745 is located between the first bearing 723 and the second bearing 743, 744.

Both miniaturization and rigidity may be further achieved.

(16) The robot 2 according to any one of (12) to (15), wherein the articulated arm 3 further comprises a frame 750 located between the link and the first hand 20 and the second hand 70 and removably attached to the link, wherein the first stator 731 is secured to the link via the frame 750 and the second stator 711 is secured directly to the link.

Both miniaturization and assemblability may be further achieved.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A robot for handling an electronic substrate, the robot comprising:
    an articulated arm comprising a plurality of links connected by a plurality of joints, wherein the plurality of links comprise:
        a first hand and a second hand each of which is configured to support the electronic substrate;
        a base; and
        one or more arm links connecting the first hand and the second hand to the base; and
    a plurality of motors configured to drive the plurality of joints respectively to change a position and a posture of the first hand and the second hand,
    wherein the plurality of joints comprise a hand joint connecting the first hand and the second hand to an arm link of the one or more arm links,
    wherein the plurality of motors comprise a hand motor configured to independently rotate the first hand and the second hand around a hand axis along a vertical orientation perpendicular to the electronic substrate supported by the first hand or the second hand, and
    wherein the hand motor comprises:
        a first output shaft fixed to the first hand;
        a first stator configured to apply a rotating magnetic field around the hand axis on the first output shaft in the arm link, wherein the first output shaft comprises a first rotor facing the first stator in a radial direction perpendicular to the hand axis and receiving the rotating magnetic field from the first stator;
        a second output shaft extending through the first output shaft and fixed to the second hand;
        a second stator configured to apply a rotating magnetic field around the hand axis on the second output shaft in the arm link, wherein the second output shaft comprises a second rotor facing the second stator in the radial direction and receiving the rotating magnetic field from the second stator;
        a fixed shaft fixed to the arm link and inserted into the second output shaft along the hand axis;
        a first bearing held by the fixed shaft between an outer periphery of the fixed shaft and an inner periphery of the second output shaft, and holding the second output shaft to rotate around the hand axis; and
        a second bearing held by the second output shaft between an outer periphery of the second output shaft and an inner periphery of the first output shaft, and holding the first output shaft to rotate around the hand axis.

2. The robot according to claim 1, wherein the first bearing holds the second output shaft, and
    wherein the hand motor further comprises a third bearing held by the arm link, and holding the first output shaft to rotate around the hand axis.

3. The robot according to claim 1, wherein the hand motor comprises a motor housing that houses and unitizes the first stator, the second stator, the first output shaft, the second output shaft, and the fixed shaft, wherein the arm link comprises a first portion and a second portion, the first portion being located between the second portion and both the first hand and the second hand, and wherein the motor housing is attached to the first portion.

4. The robot according to claim 3, wherein the motor housing comprises:
   a first housing that houses the first stator;
   a second housing that houses the second stator; and
   a fastening member attaching the second housing to the first housing, and
   wherein the first housing is attached to the first portion of the arm link.

5. The robot according to claim 1, wherein the arm link comprises a first portion and a second portion, the first portion being located between the second portion and both the first hand and the second hand,
   wherein the first stator is attached to the first portion, and
   wherein the second stator is attached to the second portion.

6. The robot according to claim 5, wherein the arm link further comprises:
   a first accommodation hole formed in the first portion and opening toward both the first hand and the second hand, and accommodating the first stator;
   a second accommodation hole formed in the second portion and opening toward a direction away from both the first hand and the second hand, and accommodating the second stator; and
   an inward flange partitioning between the first accommodation hole and the second accommodation hole and surrounding the second output shaft.

7. The robot according to claim 6, wherein the first stator is directly fixed to an inner surface of the first accommodation hole, and
   wherein the second stator is directly fixed to an inner surface of the second accommodation hole.

8. The robot according to claim 7, wherein the hand motor further comprises:
   a first rotation sensor configured to detect rotation of the first output shaft; and
   a second rotation sensor configured to detect rotation of the second output shaft, and
   wherein the first stator and the second stator are disposed between the first rotation sensor and the second rotation sensor.

9. The robot according to claim 8, wherein the articulated arm further comprises a cover surrounding the first output shaft and attached to the arm link between the first hand and the arm link,
   wherein the first rotation sensor comprises:
      a first disk configured to rotate together with the first output shaft within the cover; and
      a first sensor head attached to the cover and to detect rotation of the first disk,
   wherein the fixed shaft comprises a flange attached to the second portion from a direction away from both the first hand and the second hand, and
   wherein the second rotation sensor comprises:
      a second disk configured to rotate together with the second output shaft between the flange and the second stator; and
      a second sensor head attached to the flange to detect rotation of the second disk.

10. The robot according to claim 8, wherein an inner surface of the first accommodation hole is formed with a first recess spaced apart from the first stator,
   wherein an inner surface of the second accommodation hole is formed with a second recess spaced apart from the second stator,
   wherein a first sensor cable is wired to the first rotation sensor via the first recess, and
   wherein a second sensor cable is wired to the second rotation sensor via the second recess.

11. A robot for handling an electronic substrate, the robot comprising:
   an articulated arm comprising a plurality of links connected by a plurality of joints, wherein the plurality of links comprise:
      a first hand and a second hand each of which is configured to support the electronic substrate;
      a base; and
      one or more arm links connecting the first hand and the second hand to the base; and
   a plurality of motors configured to drive the plurality of joints respectively to change a position and a posture of the first hand and the second hand,
   wherein the plurality of joints comprise a hand joint connecting the first hand and the second hand to an arm link of the one or more arm links,
   wherein the plurality of motors comprise a hand motor configured to independently rotate the first hand and the second hand around a hand axis along a vertical orientation perpendicular to the electronic substrate supported by the first hand or the second hand,
   wherein the hand motor comprises:
      a first output shaft fixed to the first hand;
      a first stator configured to apply a rotating magnetic field around the hand axis on the first output shaft in the arm link;
      a second output shaft extending through the first output shaft and fixed to the second hand;
      a second stator configured to apply a rotating magnetic field around the hand axis on the second output shaft in the arm link;
      a first bearing held by the arm link and holding the second output shaft to rotate around the hand axis;
      a second bearing held by the second output shaft between an outer periphery of the second output shaft and an inner periphery of the first output shaft and holding the first output shaft to rotate around the hand axis; and
      a third bearing held by the arm link and holding the first output shaft to rotate around the hand axis,
   wherein the first output shaft comprises a first rotor facing the first stator along the hand axis and receiving a rotating magnetic field from the first stator, and
   wherein the second output shaft comprises a second rotor facing the second stator along the hand axis and receiving a rotating magnetic field from the second stator, and
   wherein, in an orientation along the hand axis,
      the first stator is located between the second stator and both the first hand and the second hand,
      the first rotor and the second rotor are located between the first bearing and the third bearing, and
      the third bearing is located between the first bearing and the second bearing.

12. The robot according to claim 11, wherein the first bearing and the third bearing are cross roller bearings, and
   wherein the second bearing is a radial bearing.

13. The robot according to claim 11, wherein the articulated arm further comprises a frame located between the arm link and both the first hand and the second hand,
- wherein the frame is detachably attached to the arm link,
- wherein the first stator is fixed to the arm link via the frame, and
- wherein the second stator is directly fixed to the arm link.

14. A robot comprising:
- an articulated arm comprising a plurality of links connected by a plurality of joints, wherein the plurality of links comprise:
  - a first hand and a second hand;
  - a base; and
  - one or more arm links connecting the first hand and the second hand to the base; and
- a plurality of motors configured to drive the plurality of joints respectively to change a position and a posture of the first hand and the second hand,
- wherein the plurality of joints comprise a hand joint connecting the first hand and the second hand to an arm link of the one or more arm links,
- wherein the plurality of motors comprise a hand motor configured to independently rotate the first hand and the second hand around a hand axis, and
- wherein the hand motor comprises:
  - a first output shaft fixed to the first hand;
  - a first stator configured to apply a rotating magnetic field around the hand axis on the first output shaft in the arm link, wherein the first output shaft comprises a first rotor facing the first stator in a radial direction perpendicular to the hand axis and receiving the rotating magnetic field from the first stator;
  - a second output shaft extending through the first output shaft and fixed to the second hand;
  - a second stator configured to apply a rotating magnetic field around the hand axis on the second output shaft in the arm link, wherein the second output shaft comprises a second rotor facing the second stator in the radial direction and receiving the rotating magnetic field from the second stator;
  - a fixed shaft fixed to the arm link and inserted into the second output shaft along the hand axis;
  - a first bearing held by the fixed shaft between an outer periphery of the fixed shaft and an inner periphery of the second output shaft, and holding the second output shaft to rotate around the hand axis; and
  - a second bearing held by the second output shaft between an outer periphery of the second output shaft and an inner periphery of the first output shaft, and holding the first output shaft to rotate around the hand axis.

15. The robot according to claim 14, wherein the first bearing holds the second output shaft, and
- wherein the hand motor further comprises a third bearing held by the arm link, and holding the first output shaft to rotate around the hand axis.

16. The robot according to claim 14, wherein the hand motor comprises a motor housing that houses and unitizes the first stator, the second stator, the first output shaft, the second output shaft, and the fixed shaft,
- wherein a first portion of the arm link is located between both the first stator and the second stator, and both the first hand and the second hand,
- wherein both the first stator and the second stator are located between the first portion and a second portion of the arm link, and
- wherein the motor housing is attached to the first portion.

17. The robot according to claim 14, wherein the hand motor comprises a motor housing that houses and unitizes the first stator, the second stator, the first output shaft, the second output shaft, and the fixed shaft,
- wherein the arm link comprises a first portion and a second portion, the first portion being located between the second portion and both the first hand and the second hand, and
- wherein the motor housing is attached to the first portion.

18. The robot according to claim 17, wherein the motor housing comprises:
- a first housing that houses the first stator;
- a second housing that houses the second stator; and
- a fastening member attaching the second housing to the first housing, and
- wherein the first housing is attached to the first portion of the arm link.

19. The robot according to claim 14, wherein the arm link comprises a first portion and a second portion, the first portion being located between the second portion and both the first hand and the second hand,
- wherein the first stator is attached to the first portion, and
- wherein the second stator is attached to the second portion.

20. A robot for handling an electronic substrate, the robot comprising:
- an articulated arm comprising a plurality of links connected by a plurality of joints, wherein the plurality of links comprise:
  - a first hand and a second hand each of which is configured to support the electronic substrate;
  - a base; and
  - one or more arm links connecting the first hand and the second hand to the base; and
- a plurality of motors configured to drive the plurality of joints respectively to change a position and a posture of the first hand and the second hand,
- wherein the plurality of joints comprise a hand joint connecting the first hand and the second hand to an arm link of the one or more arm links,
- wherein the articulated arm further comprises a frame located between the arm link and both the first hand and the second hand,
- wherein the frame is detachably attached to the arm link,
- wherein the first stator is fixed to the arm link via the frame,
- wherein the second stator is directly fixed to the arm link,
- wherein the plurality of motors comprise a hand motor configured to independently rotate the first hand and the second hand around a hand axis along a vertical orientation perpendicular to the electronic substrate supported by the first hand or the second hand, and
- wherein the hand motor comprises:
  - a first output shaft fixed to the first hand;
  - a first stator configured to apply a rotating magnetic field around the hand axis on the first output shaft in the arm link, wherein the first output shaft comprises a first rotor facing the first stator along the hand axis and receiving a rotating magnetic field from the first stator;
  - a second output shaft extending through the first output shaft and fixed to the second hand;
  - a second stator configured to apply a rotating magnetic field around the hand axis on the second output shaft in the arm link, wherein the second output shaft comprises a second rotor facing the second stator along the hand axis and receiving a rotating magnetic field from the second stator;
a first bearing held by the arm link and holding the first output shaft or the second output shaft to rotate around the hand axis; and
a second bearing held by the second output shaft between an outer periphery of the second output shaft and an inner periphery of the first output shaft, to hold the first output shaft to rotate around the hand axis.

* * * * *